United States Patent
Jung et al.

(10) Patent No.: US 9,432,883 B2
(45) Date of Patent: Aug. 30, 2016

(54) METHOD OF CONTROLLING SIGNALING IN WIRELESS COMMUNICATION SYSTEM AND DEVICE FOR SUPPORTING THE METHOD

(71) Applicant: LG ELECTRONICS INC., Seoul (KR)

(72) Inventors: Sunghoon Jung, Anyang-si (KR); Youngdae Lee, Anyang-si (KR); Sungjun Park, Anyang-si (KR); Seungjune Yi, Anyang-si (KR); Jaewook Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 14/398,345

(22) PCT Filed: May 3, 2013

(86) PCT No.: PCT/KR2013/003854
§ 371 (c)(1),
(2) Date: Oct. 31, 2014

(87) PCT Pub. No.: WO2013/165209
PCT Pub. Date: Nov. 7, 2013

(65) Prior Publication Data
US 2015/0131613 A1    May 14, 2015

Related U.S. Application Data

(60) Provisional application No. 61/641,910, filed on May 3, 2012.

(51) Int. Cl.
| | |
|---|---|
| H04W 36/00 | (2009.01) |
| H04W 24/10 | (2009.01) |
| H04W 36/22 | (2009.01) |
| H04W 36/04 | (2009.01) |
| H04W 48/20 | (2009.01) |

(52) U.S. Cl.
CPC ......... *H04W 36/0005* (2013.01); *H04W 24/10* (2013.01); *H04W 36/22* (2013.01); *H04W 36/04* (2013.01); *H04W 48/20* (2013.01)

(58) Field of Classification Search
None
See application file for complete search history.

(56) References Cited

U.S. PATENT DOCUMENTS

| | | | |
|---|---|---|---|
| 2010/0113070 A1 | 5/2010 | Nigam et al. | |
| 2011/0299440 A1 | 12/2011 | Choi et al. | |
| 2011/0300868 A1* | 12/2011 | Matsuo | H04W 36/0072 455/436 |
| 2012/0244903 A1* | 9/2012 | Fong | H04W 8/20 455/517 |
| 2012/0263145 A1* | 10/2012 | Marinier | H04W 36/22 370/331 |
| 2012/0327904 A1 | 12/2012 | Park et al. | |
| 2013/0084892 A1* | 4/2013 | Teyeb | H04W 4/023 455/456.6 |

FOREIGN PATENT DOCUMENTS

| | | |
|---|---|---|
| KR | 10-2010-0016881 A | 2/2010 |
| KR | 10-2010-0048918 A | 5/2010 |
| KR | 10-2010-0094354 A | 8/2010 |
| KR | 10-2011-0103143 A | 9/2011 |

* cited by examiner

*Primary Examiner* — Hong Cho
(74) *Attorney, Agent, or Firm* — Birch, Stewart, Kolasch & Birch, LLP

(57) ABSTRACT

A signaling controlling method that is performed by user equipment in a wireless communication system is provided. The method includes: receiving an operation control message from a serving cell, wherein the operation control message includes control information for controlling a user equipment-originated indication; determining based on the control information whether to report the user equipment-originated indication; and generating and transmitting the user equipment-originated indication to the serving cell if it is determined that the user equipment-originated indication is to be reported.

13 Claims, 19 Drawing Sheets

METHOD OF CONTROLLING SIGNALING IN WIRELESS COMMUNICATION SYSTEM AND DEVICE FOR SUPPORTING THE METHOD

CROSS REFERENCE TO RELATED APPLICATIONS

This application is the National Phase of PCT International Application No. PCT/KR2013/003854, filed on May 3, 2013, which claims priority under 35 U.S.C. 119(e) to U.S. Provisional Application No. 61/641,910, filed on May 3, 2012, all of which are hereby expressly incorporated by reference into the present application.

BACKGROUND OF THE INVENTION

1. Field of the invention

The present invention relates to wireless communication, and more particularly, to a method of controlling signaling in a wireless communication system and a device for supporting the method.

2. Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A network enables a UE-originated indication including UE-related information including an operating environment of UE, information related with a service which is desired to be received, and the like to be transmitted. When the network acquires the UE-related information through the UE-oriented indication, the network can be operated so as for the UE to move or receive a specific service based on frequency and/or cell information provided from the UE information.

Information on a frequency and/or cell indicated by the UE information of the UE-oriented indication may be information to which a network environment is not substantially reflected. Accordingly, when the network operates the UE based on the information on the corresponding frequency and/or cell, an original purpose through the UE-oriented indication may not be satisfied. In order to prevent such a problem, a method in which the network controls signaling related with transmission of the UE-oriented indication is required to be proposed.

SUMMARY OF THE INVENTION

An object of the present invention is to provide a method of controlling signaling in a wireless communication system and a device for supporting the method.

In an aspect, provided is a method of controlling signaling performed by UE in a wireless communication system. The method includes: receiving an operation control message from a serving cell, wherein the operation control message includes control information for controlling a user equipment-originated indication; determining based on the control information whether to report the user equipment-originated indication; generating the user equipment-originated indication if it is determined that the user equipment-originated indication is to be reported; and transmitting the user equipment-originated indication to a serving cell.

The control information includes at least one of a frequency list and a cell list in which reporting the UE-originated indication is permitted.

The method may further include sensing a specific-type cell. The UE-originated indication may be a cell sensing indication that indicates that the specific-type cell is sensed.

The specific-type cell is a member closed subscriber group (CSG) cell which the user equipment is permitted to access. The cell sensing indication may be a proximity indication indicating that the UE enters an area of the member CSG cell.

The control information may include the cell list. The determining of whether to report the user equipment-originated indication may include determining that the user equipment-originated indication is to be reported when a specific member CSG cell included in the cell list is sensed.

The control information may include the frequency list. The determining of whether to report the user equipment-originated indication may include determining that the user equipment-originated indication is reported when a specific member CSG cell which is to be operated on a frequency included in the frequency list is sensed.

The proximity indication may include information that indicates radio access technology (RAT) of the member CSG cell and a frequency of the specific member CSG cell.

The method may further include performing a handover to the specific member CSG cell.

The specific-type cell may be a small cell installed for offloading. The cell sensing indication may be a proximity indication or measurement report message triggered when the small cell is sensed.

The control information may include the cell list. The determining of whether to report the user equipment-originated indication may include determining that the user equipment-originated indication is to be reported when a specific small cell included in the cell list is sensed.

The control information may include the frequency list. The determining of whether to report the user equipment-originated indication may include determining that the user equipment-originated indication is to be reported when a specific small cell which is operated on a frequency included in the frequency list is sensed.

The method may further include receiving system information from the serving cell. The system information may include system information block type 15 (SIB 15) including information on at least one multimedia broadcast and multicast service (MBMS) frequency. The UE-originated indication is an MBMS interest indication indicating that the UE is interested in an MBMS.

The determining of whether to report the user equipment-originated indication may include determining that the user equipment-originated indication is to be reported when at least one MBMS frequency of the SIB 15 includes a target frequency included in the frequency list.

The MBMS interest indication may include information that indicates the target frequency.

The method may further include moving to a neighbor cell which is operated in the target frequency.

In another aspect, provided is UE that operates in a wireless communication system. The UE includes: a radio frequency (RF) unit which transmits and receives a radio signal; and a processor which operates in functional association with the RF unit. The processor may be configured to receive an operation control message from a serving cell, wherein the operation control message includes control information for controlling a user equipment-originated indication, determine based on the control information whether to report the user equipment-originated indication, generate the user equipment-originated indication if it is determined that the user equipment-originated indication is to be reported, and transmit the user equipment-originated indication to a serving cell.

According to the exemplary embodiments of the present invention, the network can control signaling related with the UE-originated indication of the UE. Therefore, the network may be configured to control an operation of the UE to be suitable for a current communication environment or receive a better service by moving to a specific frequency and/or cell.

DESCRIPTION OF EXEMPLARY EMBODIMENTS

Figure 1:
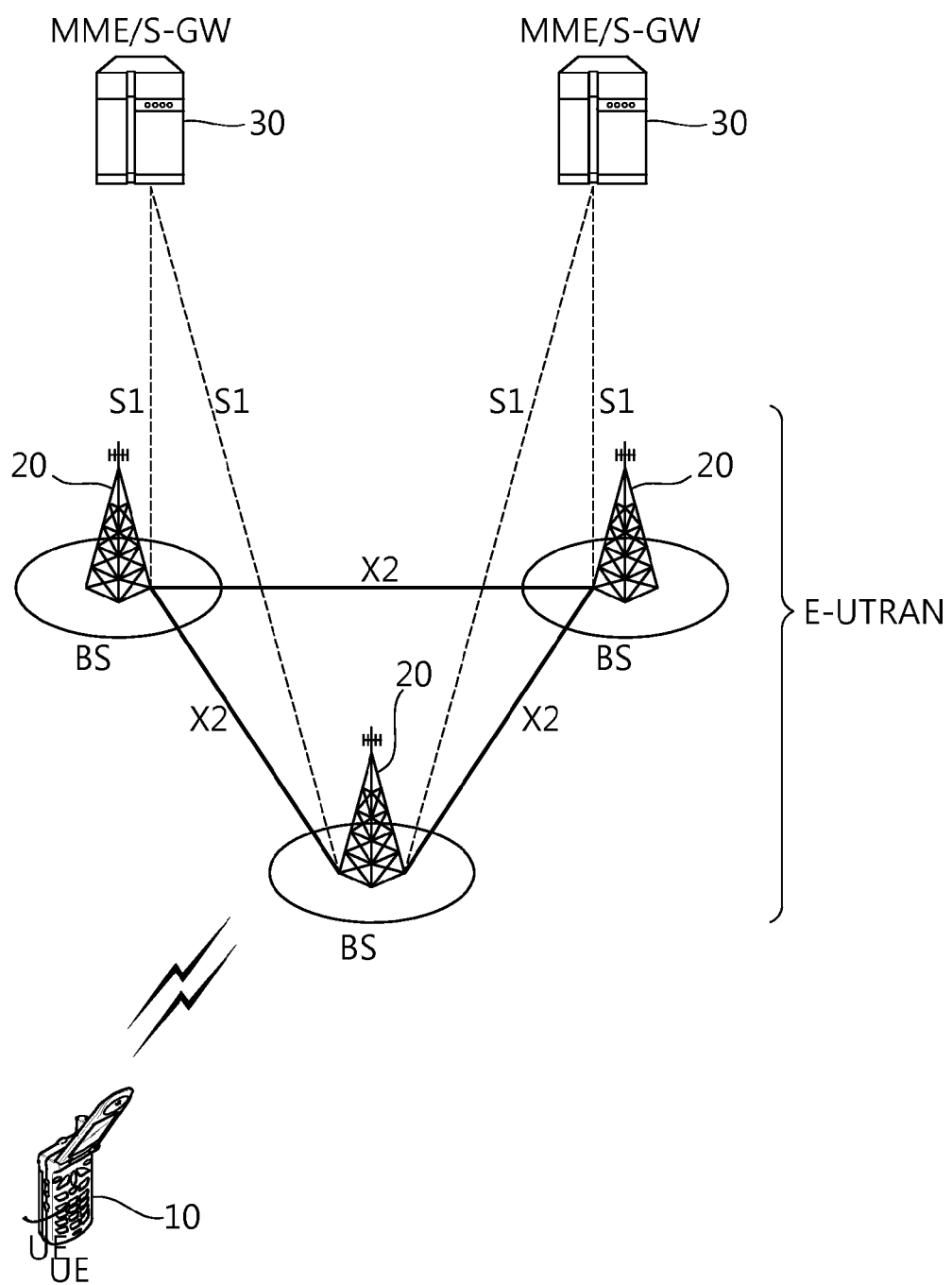
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
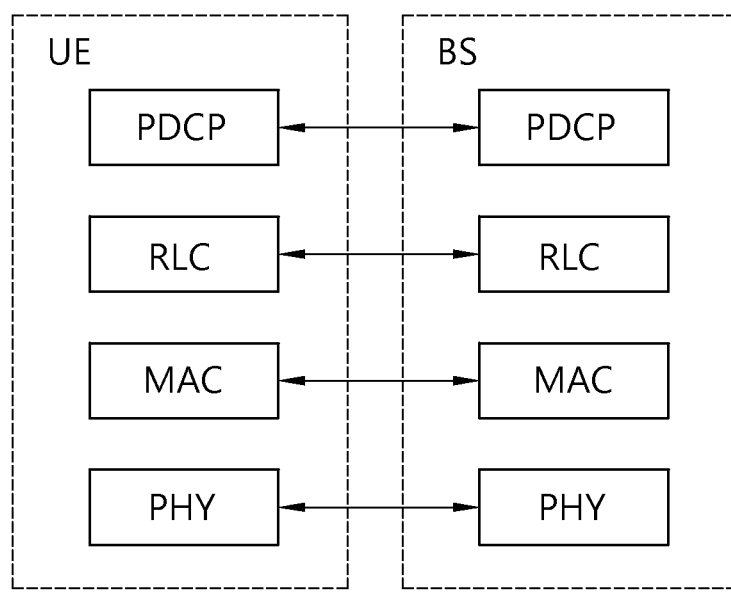
FIG. 2 is a block diagram illustrating a radio protocol architecture for a user plane.
Figure 3:
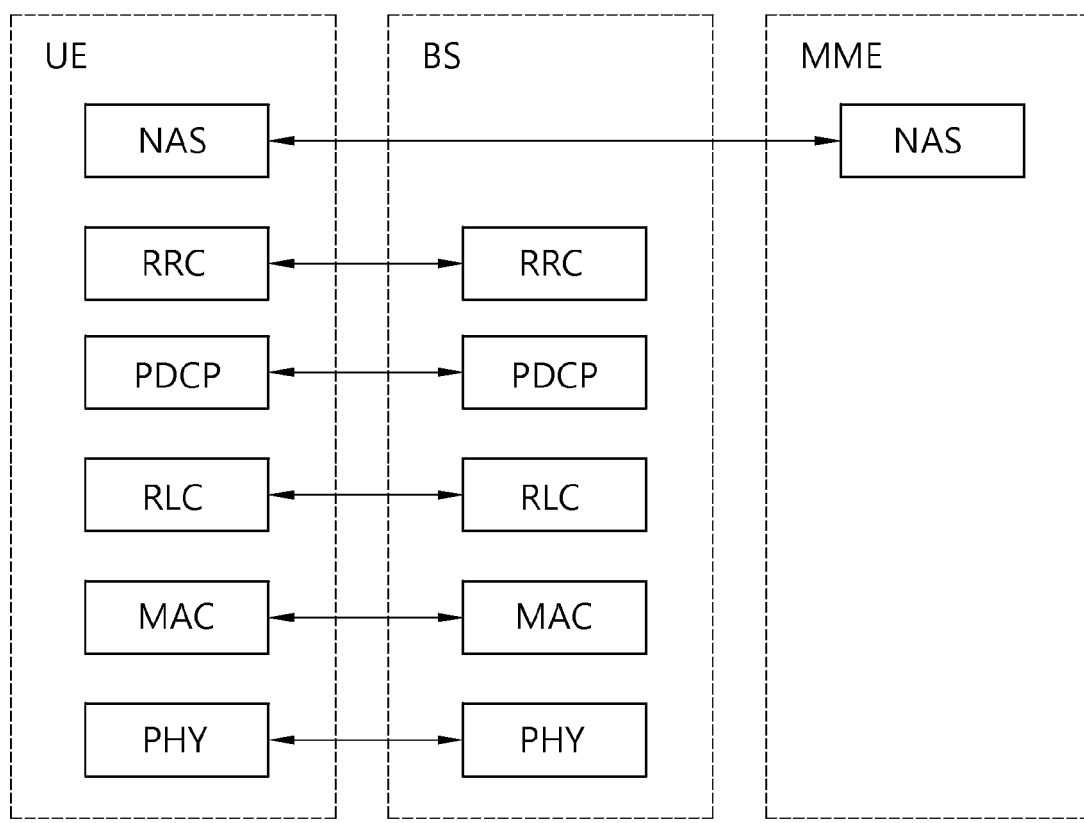
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information.

According to section 5.2.2 of 3GPP TS 36.331 V8.7.0 (2009-09) "Radio Resource Control (RRC); Protocol specification (Release 8)", the system information is divided into a master information block (MIB), a scheduling block (SB), and a system information block (SIB). The MIB allows the UE to know a physical configuration of the corresponding cell, for example, a bandwidth. The SB notifies transmission information of the SIBs, for example, a transmission period and the like. The SIB is a set of system information related to each other. For example, any SIB includes only information on a peripheral cell, and any SIB includes only information on an uplink radio channel used in the UE.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
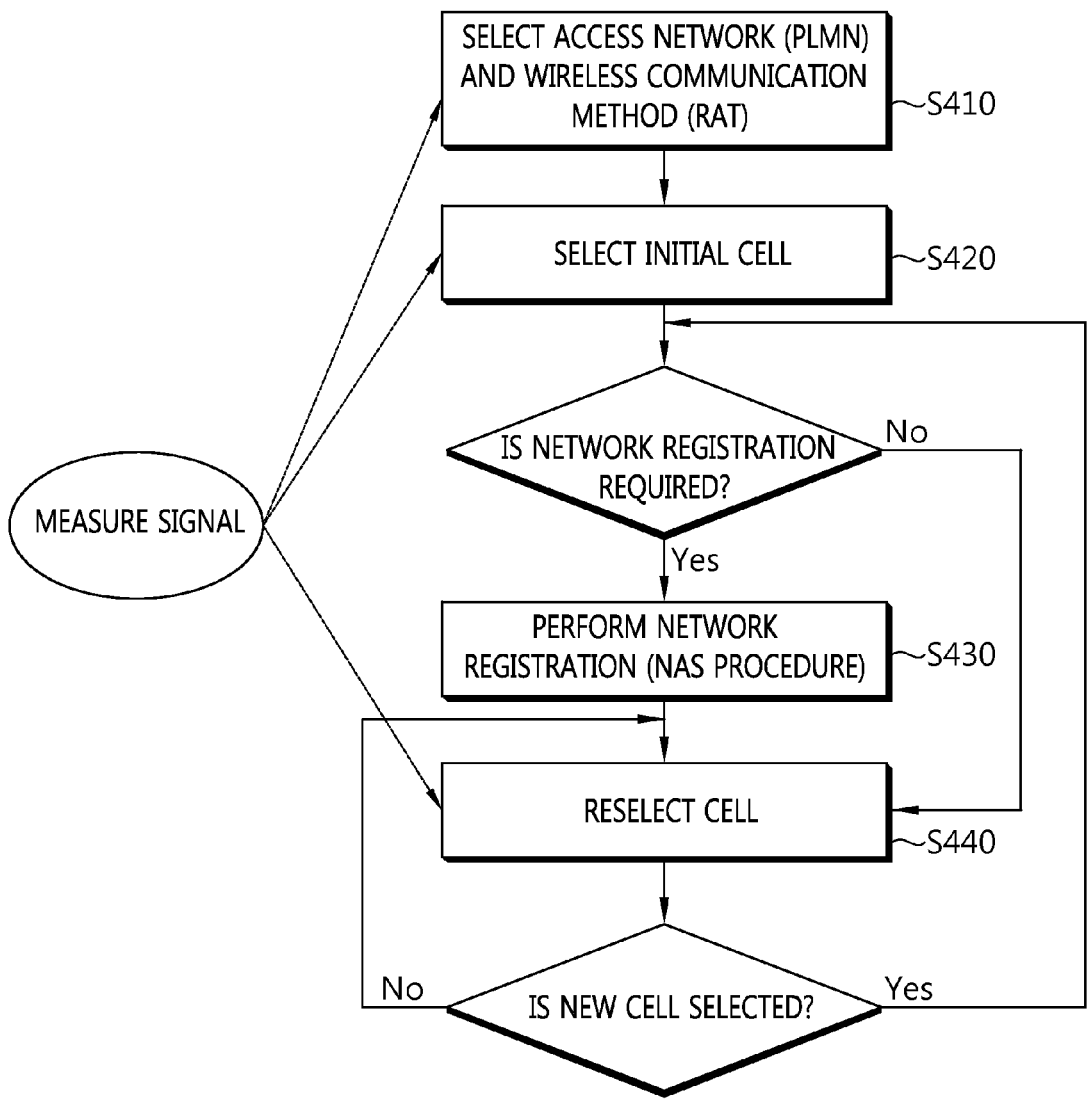
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
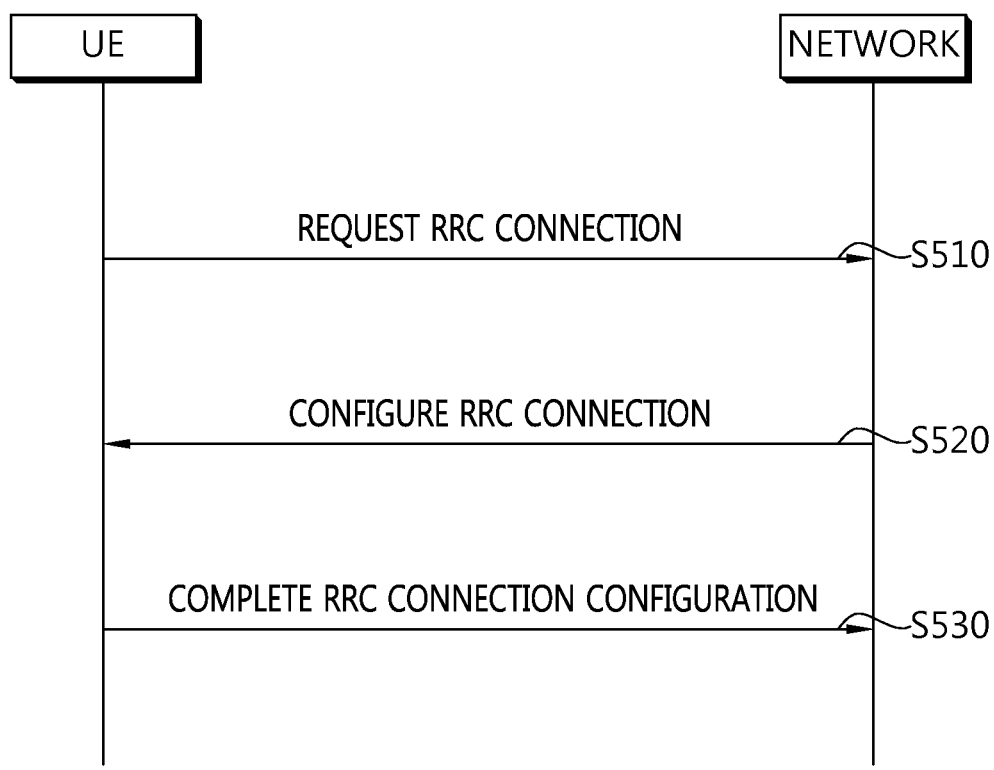
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
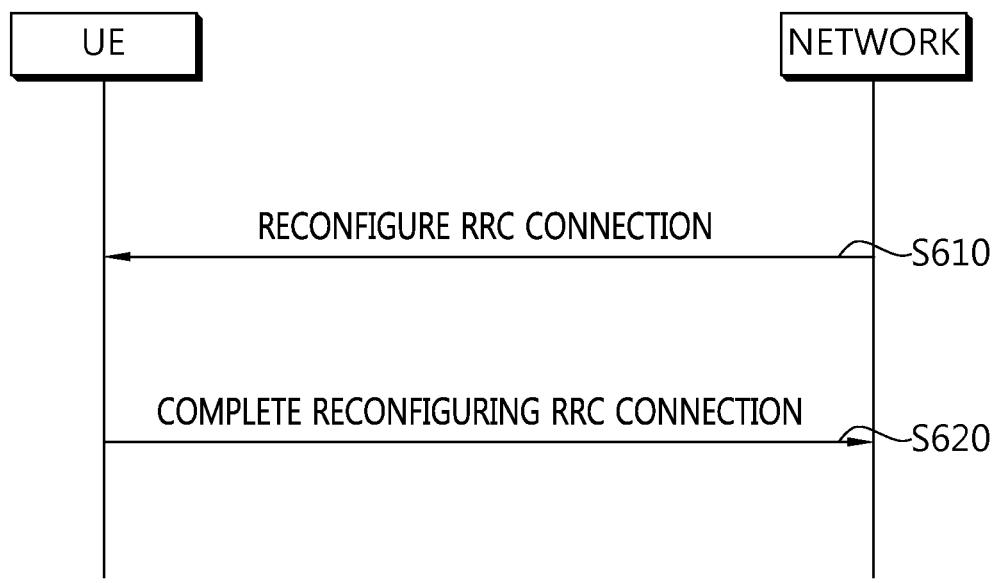
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_s = Q_{meas,s} + Q_{hyst}, \quad R_n = Q_{meas,n} - Q_{offset}$$ [Equation 1]

Here, $R_s$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequency}$.

When the ranking criterion $R_s$ of the serving cell and the ranking criterion $R_n$ of the neighbor cell are changed in a similar state, the ranking order is frequently reversed as the changing result, and as a result, the UE may alternately reselect the two cells. $Q_{hyst}$ is a parameter for preventing the UE from alternately reselecting the two cells by giving the hysteresis in the cell reselection.

The UE measures the $R_s$ of the serving cell and the $R_n$ of the neighbor cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

Hereinafter, radio link monitoring (RLM) will be described.

The UE monitors downlink quality based on a cell-specific reference signal in order to detect the downlink radio link quality of the PCell. The UE estimates the downlink radio link quality for monitoring the downlink radio link quality and compares the estimated quality with threshold values Qout and Qin. The threshold value Qout is defined as a level in which the downlink radio link may not be stably received, and corresponds to a block error rate of 10% of hypothetical PDCCH transmission by considering a PDFICH error. The threshold value Qin is defined a downlink radio link quality level which may be more stably received than the level of the Qout and corresponds to a block error rate of 2% of hypothetical PDCCH transmission by considering a PCFICH error.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:

a case where the UE determines that there is a serious problem in the downlink communication link quality based on the radio quality measuring result of the PHY layer (determines that the quality of the PCell is low during the RLM.

a case where the UE determines that there is a problem in the uplink transmission when a random access procedure is continuously failed in a MAC sub-layer.

a case where the UE determines that there is a problem in the uplink transmission when uplink data transmission is continuously failed in an RLC sub-layer.

a case where the UE determines that the handover is failed.

a case where a massage received by the UE does not pass through an integrity check.

Hereinafter, the RRC connection re-establishment procedure will be described in more detail.

Figure 7:
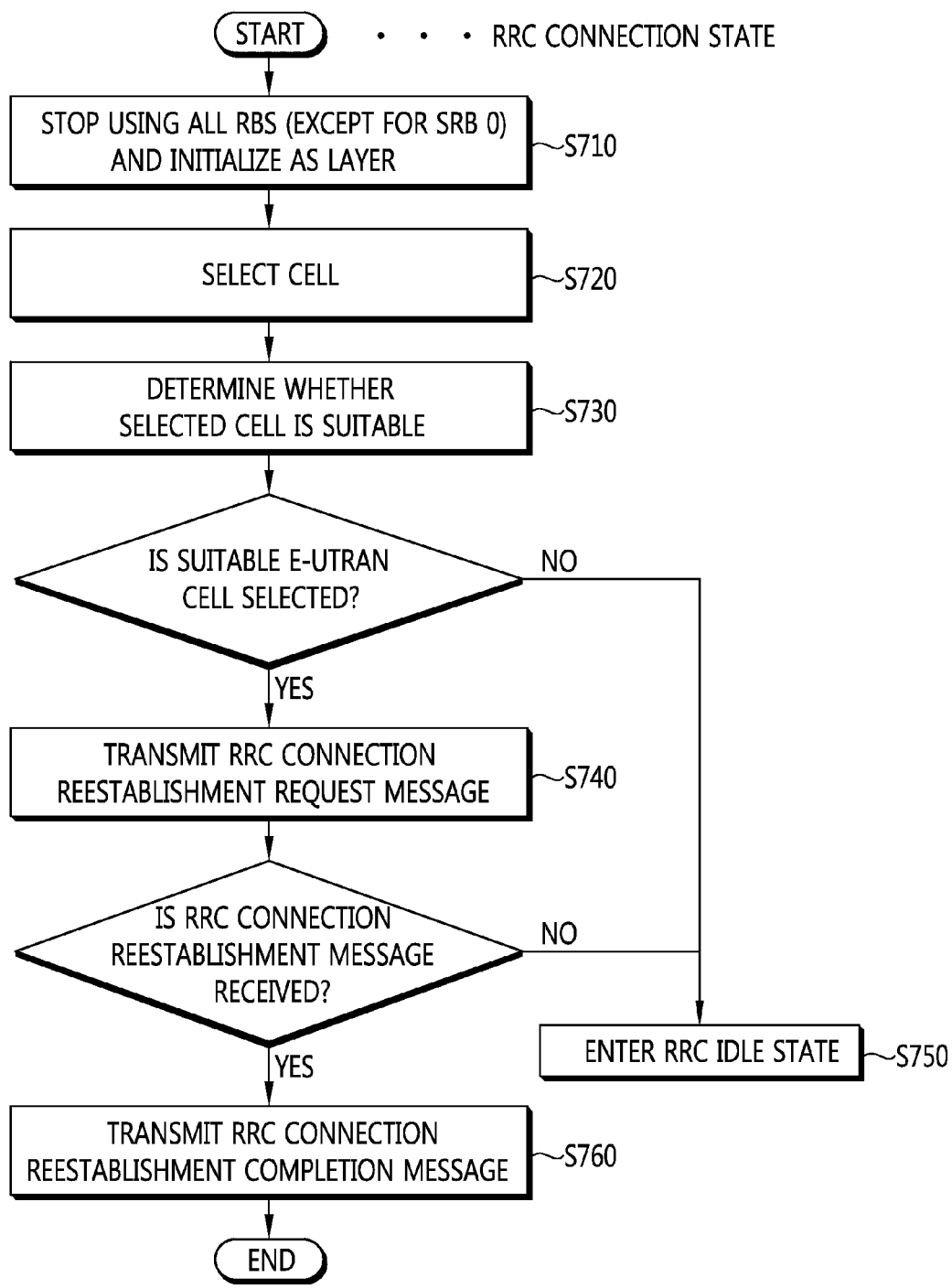
FIG. 7 is a diagram illustrating a RRC connection re-establishment procedure.

FIG. 7 is a diagram illustrating a RRC connection re-establishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB1 between the UE and the cell is opened, and the RRC control message may be transmitted and received. The UE completes the restarting of the SRB 1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Next, a report of the RLF will be described.

When the RLF is generated or a handover failure is generated, the UE reports such a failure event to the network in order to support mobility robustness optimisation (MRO) of the network.

After the RRC connection reestablishment, the UE may provide the RLF report to the eNB. The radio measurement included in the RLF report may be used as a potential cause of the failure in order to identify coverage problems. This information may be used for excluding the events in the MRO evaluation for the intra-LTE mobility connection failure and transmitting the events as inputs for other algorithms.

When the RRC connection reestablishment is failed or the UE does not perform the RRC connection reestablishment, the UE is reconnected in the idle mode to generate the valid RLF report for the eNB. For the purpose, the UE stores information on the latest RLF or the handover failure, and may indicate to the LTE cell that the RLF report is valid every subsequent RRC connection (re)establishment and handover, until the RLF report is asked by the network or for 48 hours after the RLF or the handover failure is detected.

The UE maintains the information for the state transition and the RAT change, and returns to the LTE RAT and then indicates the RLF report is valid again.

The validity of the RLF report in the RRC connection configuration procedure indicates that the UE receives disturbance such as connection failure and the RLF report is not transmitted to the network due to the failure. The RLF report from the UE includes the following information.

E-CGI of a last cell (in the case of RLF) which provided the service to the UE or a handover target When the E-CGI is not known, PCI and frequency information are used instead.

E-CGI of the cell which attempted to reestablishment.

E-CGI to the cell which provided the service to the UE, when the last handover is initialized, for example, message 7 (RRC connection reconfiguration) is received by the UE.

Time from the last handover initialization to the connection failure information indicating whether the connection failure is due to the RLF or the handover failure radio measurements position of the failure The eNB receiving the RLF failure from the UE may forward the report to the eNB which has provided the service to the UE before the reported connection failure. The radio measurements included in the RLF report may be used for identifying coverage issues as a potential cause of the radio link failure. This information may be used for excluding the events from the MRO evaluation of the intra-LTE mobility connection failure and transmitting the events as the input of other algorithms.

Hereinafter, a measurement and a measurement report will be described.

In a mobile communication system, supporting mobility of UE is required. Accordingly, the UE continuously measures a quality for a serving cell that provides a current service and a quality for a neighbor cell. The UE reports a measurement result to a network at an appropriate time and a network provides optimal mobility to the UE through a handover, and the like. Commonly, the measurement for the purpose is called a radio resource management (RRM) measurement.

The UE may perform a measurement for a specific purpose set by the network and reports a measurement result thereof to the network, in order to provide information to help a provider to operate the network in addition to the purpose of supporting the mobility. For example, the UE receives broadcast information of a specific cell determined by the network. The UE may report to the serving cell a cell identity (also referred to as a global cell identity) of the specific cell, position identification information (for example, tracking area code) to which the specific cell belongs, and/or other cell information (for example, whether a closed subscriber group (CSG) cell is member).

When the UE which is moving verifies that a quality in a specific region is very bad through the measurement, positional information and a measurement result regarding cells of which the qualities are bad may be reported to the network. The network may attempt optimization of the network based on the report of the measurement result of the UEs that help operating the network.

In a mobile communication system in which a frequency reuse factor is 1, mobility is most achieved among different cells which are in the same frequency band. Accordingly, in order to well guarantee the mobility of the UE, the UE needs to well measure qualities and cell information of neighbor cells having center frequencies which is the same as a center frequency of the serving cell. A measurement for the cell having the center frequency which is the same as the center frequency of the serving cell as described above is called an intra-frequency measurement. The UE reports the measurement result to the network at an appropriate time by performing the intra-frequency measurement to achieve the purpose of the corresponding measurement result.

A mobile communication provider may operate the network by using a plurality of frequency bands. When a service of the communication system is provided through the plurality of frequency bands, the UE may need to well measure qualities and cell information of neighbor cells having center frequencies which are different from the center frequency of the serving cell, in order to guarantee optimal mobility for the UE. As described above, a measurement for the cell having the center frequency which is different from the center frequency of the serving cell is called an inter-frequency measurement. The UE may need to report the measurement result to the network at an appropriate time by performing the inter-frequency measurement.

When the UE supports a measurement for the network based on an RAT, the UE may perform a measurement for a cell of the corresponding network by a configuration by the base station. The measurement is called an inter-RAT measurement. For example, the RAT may include a UMTS terrestrial radio access network (UTRAN) and a GSM EDGE radio access network (GERAN) that follow a 3GPP standard specification and may also include a CDMA 2000 system that follows a 3GPP2 standard specification.

Figure 8:
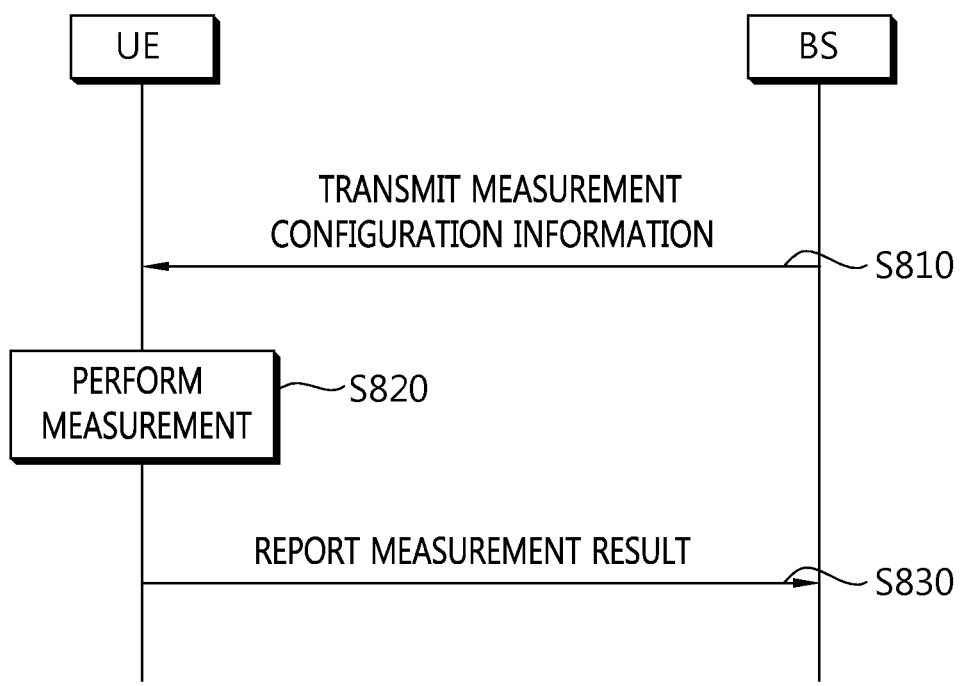
FIG. 8 is a flowchart illustrating a method for performing measurement in the related art.

FIG. 8 is a flowchart illustrating a method for performing measurement in the related art.

The UE receives measurement configuration information from the base station (S810). A message including the measurement configuration information is called a measurement configuration message. The UE performs the measurement based on the measurement configuration information (S820). The UE reports the measurement result to the base station when the measurement result satisfies a reporting condition in the measurement configuration information (S830). A message including the measurement result is called a measurement reporting message.

The measurement configuration information may include the following information.

(1) Measurement object information: The measurement object information is information on an object for which the UE is to perform a measurement. A measurement object may include at least one of an intra-frequency measurement object which is an object of an intra-cell measurement, an inter-frequency measurement object which is an object of an inter-cell measurement, and an inter-RAT measurement object which is an object of an inter-RAT measurement. For example, the intra-frequency measurement object may indicate the neighbor cell having the same frequency band as the serving cell, the inter-frequency measurement object may indicate the neighbor cell having the different frequency band from the serving cell, and the inter-RAT measurement object may indicate a neighbor cell of RAT different from the RAT of the serving cell.

(2) Reporting configuration information: The reporting configuration information is information on a reporting condition and a reporting type regarding the time when the UE reports the measurement result. The reporting condition may include information on an event or a cycle in which reporting the measurement result is triggered. The reporting type is information regarding a configuration type of the measurement result.

(3) Measurement identity information: The measurement identity information is information regarding a measurement identity that determines a measurement object, a reporting time, and a reporting type by the UE by associating the measurement object and the reporting configuration with each other. The measurement identity information is included in the measurement reporting message to represent a measurement object of the measurement result and a reporting condition of the measurement reporting which occurs.

(4) Quantity configuration information: The quantity configuration information is information on a parameter for configuring filtering of a measurement unit, a reporting unit, and/or a measurement result value.

(5) Measurement gap information: The measurement gap information is information on a measurement gap which is an interval which the UE may use for only measurement without considering data transportation with the serving cell because downlink transportation or uplink transportation is not scheduled.

The UE has a measurement object list, a measurement reporting configuration list, and a measurement identity list in order to perform a measurement procedure.

In the 3GPP LTE, the base station may configure only one measurement object for one frequency band to the UE. According to Clause 5.5.4 of 3GPP TS 36.331 V8.5.0 (2009-03) "Evolved Universal Terrestrial Radio Access (E-UTRA) Radio Resource Control (RRC); Protocol specification (Release 8)", events that trigger the measurement reporting shown in the following table are defined.

TABLE 1

| Events | Reporting conditions |
|---|---|
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

When the measurement result of the UE satisfies the configured event, the UE transports the measurement reporting message to the base station.

Figure 9:
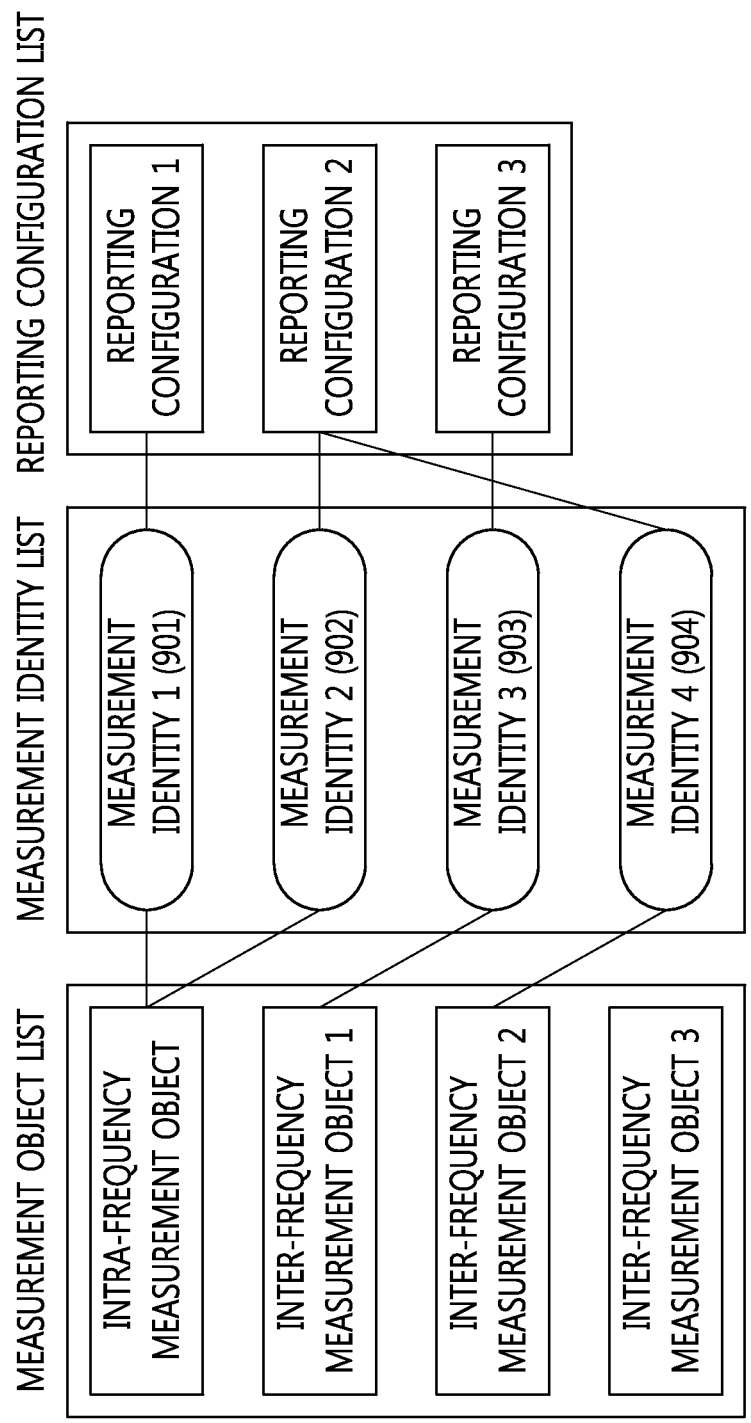
FIG. 9 illustrates an example of a measurement configuration which is configured to user equipment.

FIG. 9 illustrates an example of a measurement configuration which is configured to user equipment.

First, measurement identity 1 901 connects the intra-frequency measurement object and reporting configuration 1. The UE performs intra frequency measurement and the reporting configuration 1 is used to determine a reference and a reporting type of reporting the measurement result.

Measurement identity 2 902 is connected with the intra-frequency measurement object similarly to the measurement identity 1 901, but the intra-frequency measurement object is reporting configuration 2. The UE performs measurement and the reporting configuration 2 is used to determine the reference and the reporting type of reporting the measurement result.

By the measurement identity 1 901 and the measurement identity 2 902, the UE transports the measurement result even though the measurement result for the intra-frequency measurement object satisfies any one of the reporting configuration 1 and the reporting configuration 2.

Measurement identity 3 903 connects inter-frequency measurement object 1 and reporting configuration 3. When a measurement result for the inter-frequency measurement object 1 satisfies a reporting condition included in the reporting configuration 1, the UE reports the measurement result.

Measurement identity 4 904 connects the inter-frequency measurement object 2 and the reporting configuration 2. When a measurement result for the inter-frequency measurement object 2 satisfies a reporting condition included in the reporting configuration 2, the UE reports the measurement result.

Meanwhile, the measurement object, the reporting configuration, and/or the measurement identity may be added, changed, and/or deleted. These may be instructed when the base station sends a new measurement configuration message or a measurement configuration change message to the UE.

Figure 10:
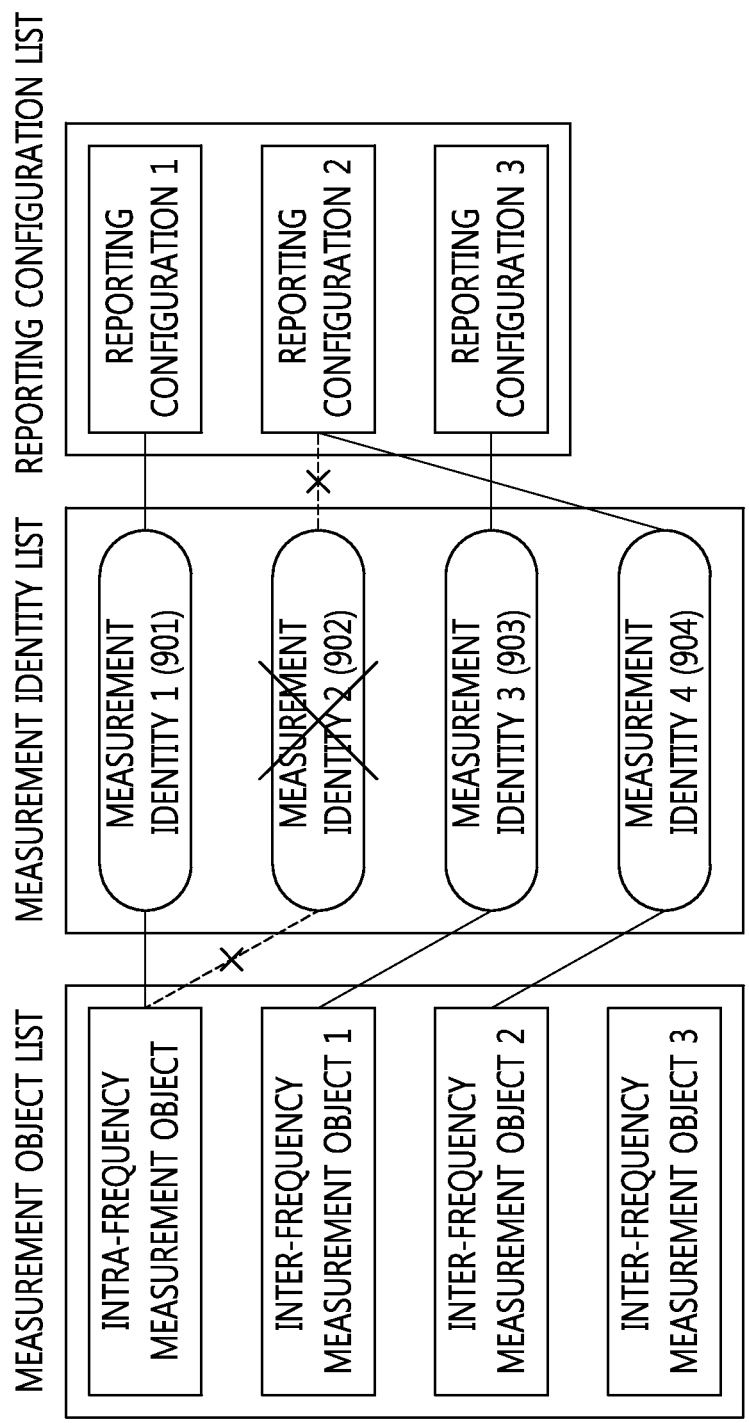
FIG. 10 illustrates an example of deleting a measurement identity.

FIG. 10 illustrates an example of deleting a measurement identity. When the measurement identity 2 902 is deleted, measurement for a measurement object associated with the measurement identity 2 902 is stopped and a measurement report is not transported. A measurement object or a reporting configuration associated with the deleted measurement identity may not be changed.

Figure 11:
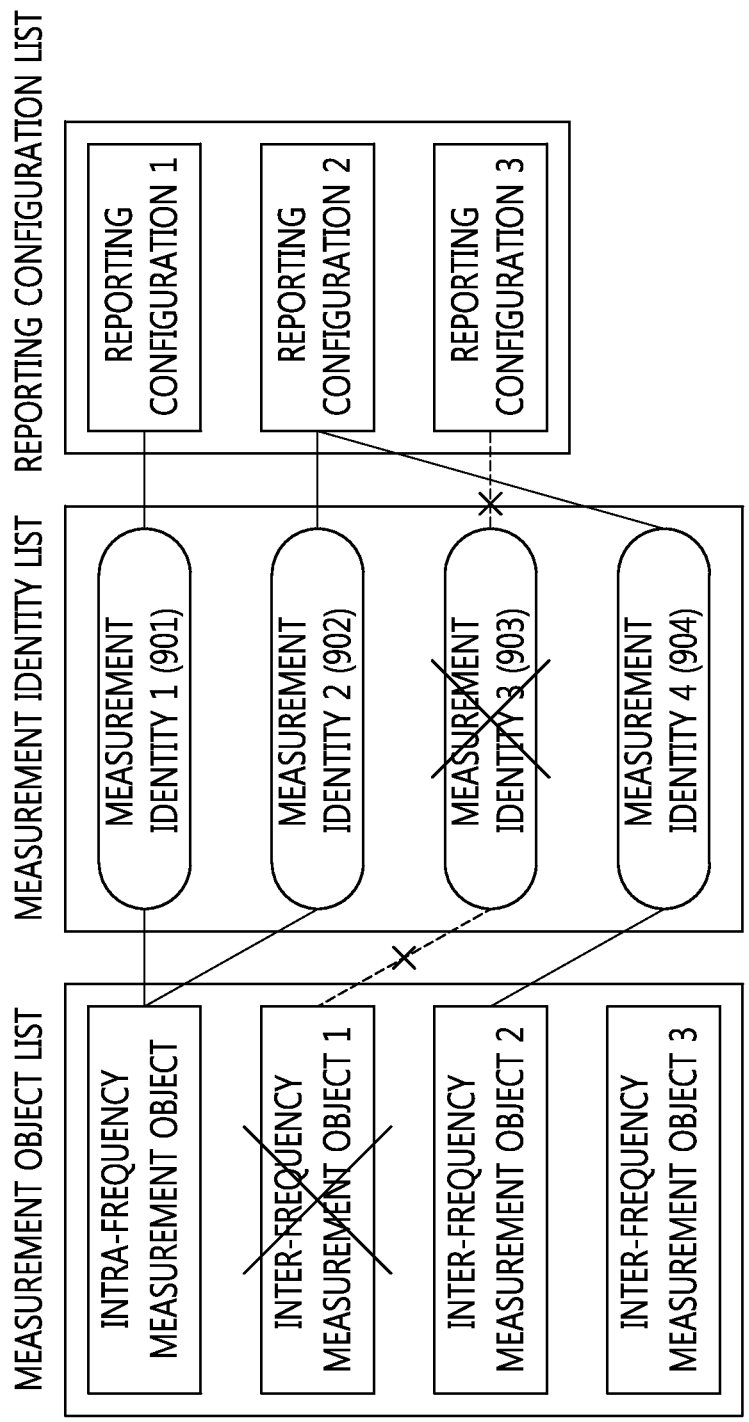
FIG. 11 illustrates an example of deleting a measurement object.

FIG. 11 illustrates an example of deleting the measurement object. When the inter-frequency measurement object 1 is deleted, the UE deletes even the measurement identity 3 903 associated therewith. Measurement for the inter-frequency measurement object 1 is stopped and a measurement report is not also transported. However, a reporting configuration associated with the deleted inter-frequency measurement object may not be changed or deleted.

When the reporting configuration is removed, the UE removes even a measurement identity associated therewith. The UE stops measurement for an associated measurement object by the associated measurement identity. However, the measurement object associated with the deleted reporting configuration may not be changed or deleted.

The measurement report may include the measurement identity, a measured quality of the serving cell, and a measurement result of the neighbor cell. The measurement identity identifies a measurement object in which the measurement report is triggered. The measurement result of the neighbor cell may include a cell identity and a measurement quality of the neighbor cell. The measured quality may include at least one of reference signal received power (RSRP) and reference signal received quality (RSRQ).

Subsequently, H(e)NB will be described.

A mobile communication service may be provided through individuals or a specific provider or a base station owned by a group in addition to a mobile communication network provider. The base station is called home NB (HNB) or home eNB (HeNB). Hereinafter, both the HNB and the HeNB are generically called the HeNB. The HeNB primarily aims at providing a service specified only to a specific user group (closed subscriber group (CSG). However, the service may be provided even to other users in addition to the CSG according to setting an operation mode of the HeNB.

Figure 12:
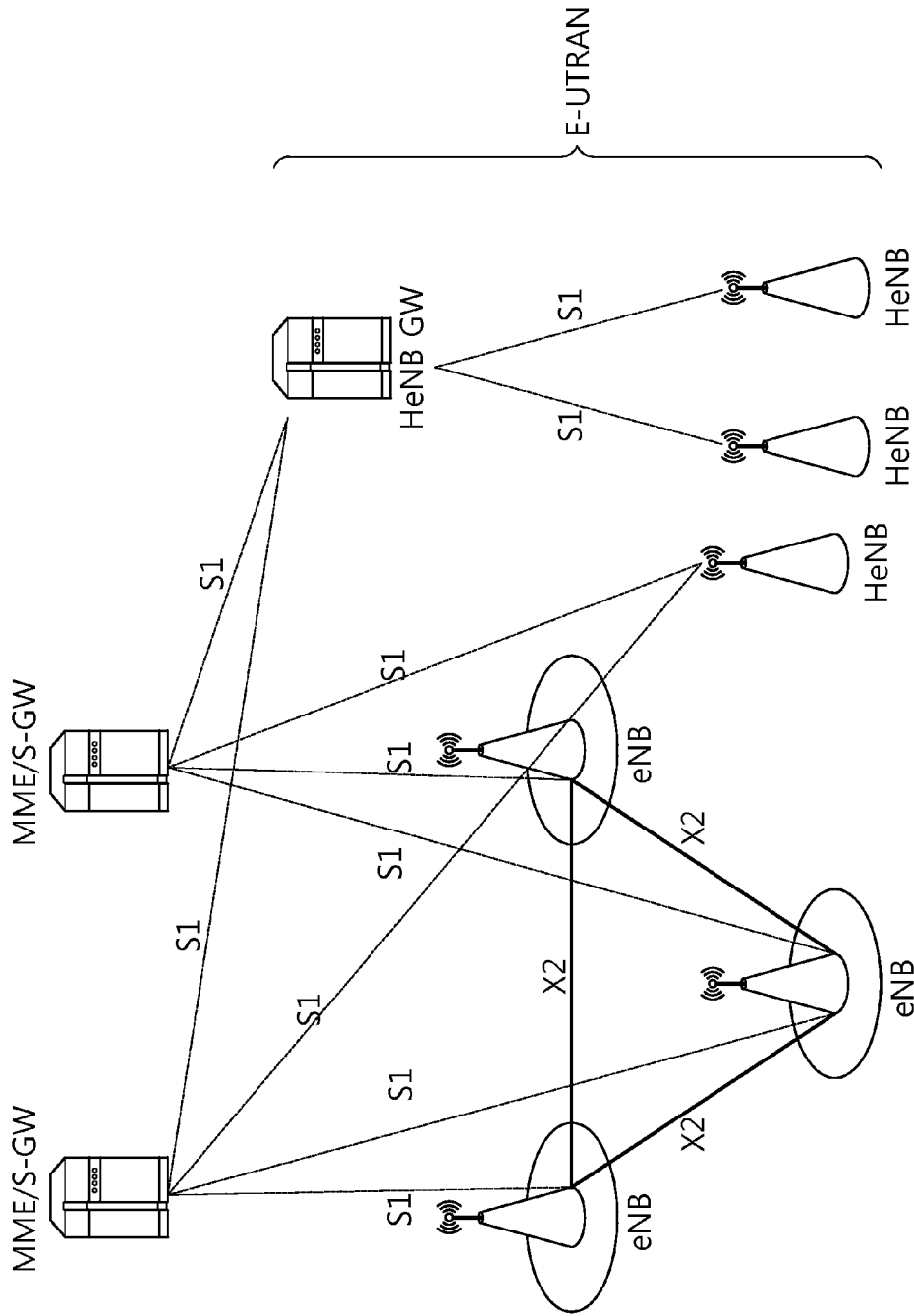
FIG. 12 is a diagram illustrating one example of a wireless communication system representing an operation of HeNB.

FIG. 12 is a diagram illustrating one example of a wireless communication system representing an operation of HeNB.

Referring to FIG. 12, a home eNB gateway (HeNB GW) may be operated in order to service the HeNB as described above. HeNBs are connected to an EPC through the HeNB GW or directly connected to the EPC. The HeNB GW seems like a general eNB to an MME. The HeNB GW seems like the MME to the HeNB. Accordingly, the HeNB and the HeNB GW are connected to each other through an S1 interface and the HeNB and the EPC are also connected to each other through the S1 interface. Further, even when the HeNB and the EPC are directly connected to each other, the HeNB and the EPC are connected to each other through the S1 interface. A function of the HeNB is most similar to a function of a general eNB.

In general, the HeNB has a low wireless transmission output than the eNB owned by the mobile communication network provider. Accordingly, service coverage provided by the HeNB is generally smaller than service coverage provided by the eNB. Due to such a feature, a cell provided by the HeNB is often classified into a femto cell as compared with a macro cell provided the eNB in terms of the service coverage. Meanwhile, in terms of the provided service, when the HeNB provides the service only to the CSG, a cell provided by the HeNB is called a CSG cell.

Each CSG has a unique identity number and the identity number is called a CSG identity (ID). The UE may have a list of the CSG to which the UE belongs and the CSG list may be changed by a request from the UE or a command from the network. In general, one HeNB may support one CSG.

The HeNB transfers the CSG ID of the CSG supported thereby through the system information to allow only member UE of the corresponding CSG to access the HeNB. When the UE discovers the CSG cell, the UE may verify which CSG the CSG cell supports by reading the CSG ID included in the system information. Only when the UE that reads the CSG ID is a member of the corresponding CSG cell, the UE is regarded as a cell that may access the corresponding cell.

Even the HeNB need not continuously permit the access only the CSG UE. According to a set-up of the configuration of the HeNB, the access by UE which is not the CSG member may also be permitted. Which UE is permitted to access is changed according to the set-up of the configuration of the HeNB and herein, the configuration set-up means a set-up of the operation mode of the HeNB. The operation mode of the HeNB is divided into three modes given below according to which UE the service being provided to.

Closed access mode: A mode to provide the service to the specific CSG member. The HeNB provides the CSG cell.

Open access mode: A mode to provide the service without a limitation such as the specific CSG member like the general eNB. The HeNB provides not the CSG cell but a general cell.

Hybrid access mode: A mode to provide a CSG service to the specific CSG member and provide the service even to a non-CSG member like the general cell. A predetermined cell is recognized as the CSG cell by the CSG member UE and recognized as the general cell by the non-CSG member UE. The cell is called a hybrid cell.

The HeNB notifies to the UE whether a cell serviced thereby is the CSG cell or the general cell to allow the UE to know whether to access the corresponding cell. The HeNB that is operated in the closed access mode broadcasts that the HeNB is the CSG cell through the system information. The HeNB that is operated in the open access mode broadcasts that the HeNB is not the CSG cell through the system information. As described above, the HeNB makes a CSG indication of 1 bit indicating whether a cell serviced thereby is the CSG cell be included in the system information. For example, the CSG cell broadcasts the CSG indication which is set as TRUE. When the serviced cell is not he CSG cell, a method of setting the CSG indication as FALSE or skipping transmission of the CSG indication may be used. Since the UE needs to distinguish the general cell provided by the eNB from the CSG cell the general eNB also transmits the CSG indication to allow the UE to know that the type of the cell provided thereby is the general cell. The general eNB does not transmit the CSG indication to allow the UE to know that the type of the cell provided thereby is the general cell. Table 2 shows CSG related parameters transmitted in a corresponding cell for each cell type. Subsequently, Table 3 shows the type of UE that permits the access for each cell type.

TABLE 2

|  | CSG cell | General cell |
| --- | --- | --- |
| CSG indication | Indicating 'CSG cell' | Indicating 'non-CSG cell' or not transmitted |
| CSG identity | Transmitting supported CSG identity | Not transmitted |

TABLE 3

|  | CSG cell | General cell |
| --- | --- | --- |
| UE not supporting CSG | Unavailable access | Available access |
| Non-CSG member UE | Unavailable access | Available access |
| Member CSG UE | Available access | Available access |

In a predetermined frequency, the CSG cell and the (normal) macro cell may be simultaneously operated. Hereinafter, the frequency will be referred to as a mixed carrier frequency. The network may separately reserve cell identities of a specific physical layer for the CSG cell in the mixed carrier frequency. The physical layer cell identity is called a physical cell identity (PCI) in the E-UTRAN system and a physical scrambling code in the UTRAN. The physical layer identity is expressed as the PCI for easy description. In the mixed carrier frequency, the CSG cell notifies information on PCIs reserved for the CSG through the system information in a current frequency. When the UE that receives the information discovers a predetermined cell in the corresponding frequency, the UE may determine whether the cell is the CSG cell or may not be the CSG cell from the PCI of the cell.

The UE that does not support a CSG related function or does not have the CSG list to which the UE belongs as the member need not regard the CSG cell as a selectable cell. In this case, the UE may verify only the PCI of the cell and when the PCI is the PCI reserved for the CSG, the corresponding cell may be immediately excluded during the cell selection/reselection process. In general, a PCI of a predetermined cell may be immediately known in a step in which the UE verifies the presence of the corresponding cell in the physical layer.

When the UE that has the CSG list to which the UE belongs intends to know a list regarding neighboring CSG cells in the mixed carrier frequency, if the UE discovers only the cell having the PCI reserved for the CSG, the UE may know that the corresponding cell is the CSG cell, instead of verifying the CSG identities of the system information of all cells discovered in the entire PCI coverage one by one.

Hereinafter, a cell reselection method related with the CSG cell will be described.

The CSG cell is a cell for supporting a better service to the corresponding CSG member UE. Accordingly, when the UE camps on the CSG cell, reselecting a cell in an inter-frequency may not be preferable in terms of service quality even though the UE an inter-frequency having a higher frequency priority than a frequency priority of a serving frequency.

When the UE camps on the CSG, the UE assumes that the frequency priority of the corresponding frequency is higher than other frequencies when a CSG cell in a predetermined frequency is determined as best ranked according to a cell reselection evaluating criterion in the frequency, in order to prevent unconditional cell reselection in the inter-frequency having the higher frequency than the serving frequency. When the UE itself designates the frequency priority higher than the frequency priority which may be designated by the network in respect to a specific frequency as described above, the frequency priority is called an implicit highest priority. This may help the UE stay in the CSG cell while the UE obeys a rule in the existing cell selection, which first considers the frequency priority upon the cell reselection. When the UE in the CSG cell reselects a non-CSG cell in the corresponding frequency, the UE withdraws an implicit highest priority assumption for the corresponding frequency and uses a frequency priority value transferred by the network upon evaluating the cell reselection. When the UE camps on the CSG cell, in the case where another CSG cell which is best ranked is discovered in a frequency having the same frequency priority, whether the UE reselects the CSG cell or remains in the CSG cell on which the UE camps at present follows implementation by the UE.

Subsequently, a handover method related with the CSG cell will be described.

The UE in the RRC connection state performs general measurement and mobility procedures based on a set-up provided from the network. The UE is not required to support manual selection of CSG IDs in the RRC connection state. A handover to the HNB/HeNB is supported by the UE and follows a framework of a handover controlled by the network. The handover to the HNB/HeNB is different from a general handover procedure in three aspects.

1. Proximity Estimation: When the UE may determine that the CSG or the hybrid cell having a CSG ID included in a CSG white list is close by using an autonomous search procedure, the UE may provide a proximity indication to a source eNB. The proximity indication may be used as follows.

When there is no measurement configuration for a considered frequency/RAT, the source enb may be configured to allow the UE to measure and report the considered frequency/RAT.

The source eNB may determine whether to perform another action related with the handover to the HNB/HeNB based on the received proximity indication. (For example, when the source enb does not receive the proximity indication, the UE may not be configured to acquire the system information of the HNB/HeNB.)

2. PSC/PCI confusion: Since a cell size of a conventional HNB/HeNB is still smaller than the size of the macro cell, a plurality of HNBs/HeNBs having the same PSC/PCI may be present in the coverage of the source eNB. This may cause a condition mentioned as the PSC/PCI confusion and this means that the source eNB determines a correct target cell for the handover from the PSC/PCI included in the measurement and reporting from the UE. The UE reports a global cell ID (GCI) of the target HNB/HeNB to solve the PSC/PCI confusion.

3. Access control: When the target cell is the hybrid cell, a priority for an assigned resource may be determined based on a membership status of the UE. The access control is achieved by two-step procedures and first, the UE reports the membership status based on the CSG ID and the CSG white list of the UE received from the target cell and determines a status in which a subsequent network is reported.

Mobility from the eNB/HeNB to the CSG/hybrid cell of the HeNB occurs together with an S1 handover procedure. Hereinafter, a source cell may be the eNB or the HeNB. The procedure may be applied to all scenarios in which the CSG ID is provided to the source eNB by the UE.

Figure 13:
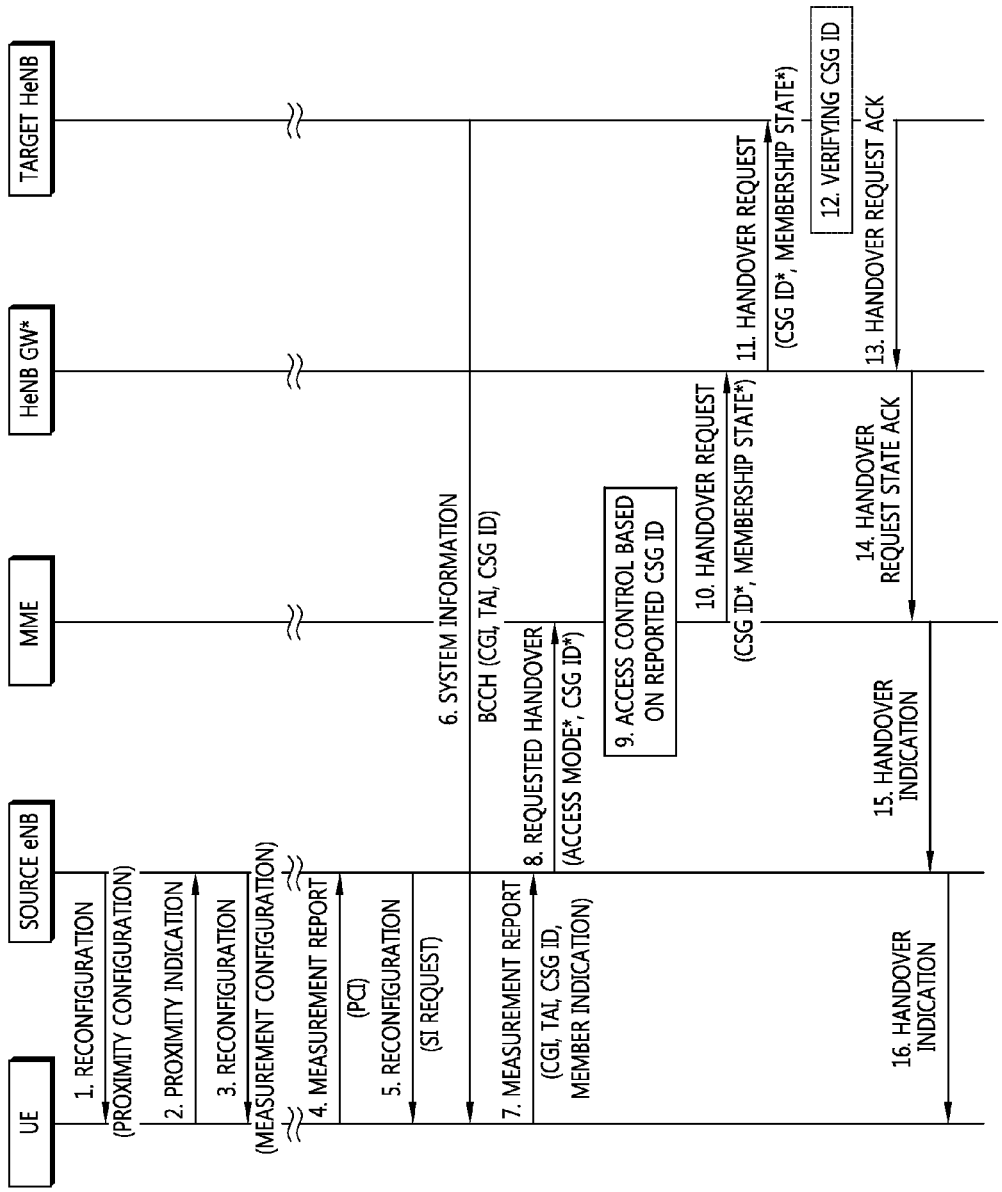
FIG. 13 is a flowchart illustrating a handover procedure for a CSG cell.

FIG. 13 is a flowchart illustrating a handover procedure for a CSG cell.

Referring to FIG. 13, the handover procedure for the CSG cell will be described below.

Step. 1. The source eNB configures a proximity indication control to the UE. To this end, the source eNB may transmit a reconfiguration message to the UE. The reconfiguration message includes information for configuring the proximity indication.

Step. 2. When the UE determines that the UE is close to the cell having the CSG ID included in the CSG white list of the UE (based on the autonomous search procedure), the UE transmits the proximity indication of "entering". The proximity indication includes the RAT and the frequency of the cell.

Step. 3. When there is no measurement configuration for the considered frequency/RAT, the source eNB sets an appropriate measurement configuration including a measurement gap to the UE as necessary, and as a result, the UE may measure the reported RAT and frequency. To this end, the source eNB transmits the reconfiguration message to the UE. The reconfiguration message may include information on the configuration of the measurement.

Further, the network avoids requesting the information to use the proximity indication in order to minimize a request for handover preparation information of the CSG/hybrid cell when the UE is not present in a geographical area at which cells having the CSG ID included in the CSG white list are positioned.

Step. 4. The UE transmits a measurement report including the PCI (for example, due to a triggered event A3).

Step. 5. The source eNB configures the UE in order to acquire the system information and report a specific PCI.

Step. 6. The UE acquires the system information by using an autonomous gap and for example, the UE may stop reception and transmission within a limited range defined in [TS 36.133] in order to acquire appropriate system information from a target HeNB.

Step. 7. The UE transmits a measurement report including an (E-)CGI, a TAI, a CSG-ID, and a "member/non-member" indication.

Step. 8. The source eNB makes a target E-CGI and a target CSG-ID be included in a handover request message transmitted to the MME. When a target is the hybrid cell, a cell access mode of the target is included.

Step. 9. The MME performs a UE access control to the CSG cell based on a received CSG-ID in the handover request message and stored CSG subscription data for the UE. When an access control procedure is failed, the MME ends the handover procedure in response to a handover preparation failure message. When there is the cell access mode, the MME determines the CSG membership status of the UE that is handed over to the hybrid cell and makes the determined CSG membership status be included in the handover request message.

Step. 10-11. The MME transmits the required handover message including the target CSG ID received through the required handover message to the target HeNB. When the target is the hybrid cell, the CSG membership status will be included in the handover request message.

Step. 12. The target HeNB verifies whether the CSG ID received through the handover request message is the broadcasted CSG ID of the target cell and when the verification is succeeded, the target HeNB assigns an appropriate resource. UE priority placement may also be applied when the CSG membership state indicates that the UE is the member.

Step. 13-14. When the HeNB GW is present, the target HeNB transmits a handover request acknowledgement (ACK) message to the MME through the HeNB GW.

Step. 15. The MME transmits a handover command message to the source eNB.

Step. 16. The source eNB transmits a handover command (an RRC connection reconfiguration message including mobility control information) to the UE.

Steps 1 to 9, 15, and 16 may be applied even to inter-RAT mobility to the HNB in the LTE.

The proximity indication of "entering" is transmitted (step. 2) and thereafter, when the UE determines that the cell having the CSG-ID included in the CSG white list of the UE is not close any longer UE, the UE transmits a proximity indication of "leaving" to the source eNB. The source eNB receives the indication and thereafter, may reconfigure the UE so as for the UE to stop measuring the reported RAT and frequency.

In the procedure, steps 2 and 3 may not be performed when the UE has not visited the HeNB ago, for example, when the UE first visits the hybrid cell.

The PCI confusion may be solved by steps 5 to 7. The source eNB may request reporting even any PCI without being limited to the acquisition of the system information and the PSC/PCI of the CSG or the hybrid cell.

Next, a multimedia broadcast and multicast service (MBMS) will be described in detail.

An MCCH channel or an MTCH channel which are logic channels may be mapped to an MCH channel which is a transmission channel for the MBMS. The MCCH channel transmits an MBMS related RRC message and the MTCH channel transmits traffics of a specific MBMS service. One MCCH channel may be present for one MBMS single frequency network (MBSFN) that transmits the same MBMS information/traffic and when a plurality of MBSFN areas is provided in one cell, the UE may receive a plurality of MCCH channels. When the MBMS related RRC message is changed in a specific MCCH channel, a PDCCH channel transmits an MBMS radio network temporary identity (M-RNTI) and an indication that indicates the specific MCCH channel. UE that supports the MBMS receives the M-RNTI and the MCCH indication through the PDCCH channel to determine that the MBMS related RRC message is changed in the specific MCCH channel and receive the specific MCCH channel. The RRC message of the MCCH channel may be changed every change cycle and is repeatedly broadcasted every repeated cycle.

The UE may receive a dedicated service while receiving the MBMS service. For example, a predetermined user may perform chatting by using an instant messaging (IM) service such as MSM or Skype by using a smart phone while watching a TV by using the MBMS service, through the smart phone possessed thereby. In this case, the MBMS service may be provided through an MTCH together received by various UEs and services individually provided to respective UEs like the IM service may be provided through a dedicated bearer such as a DCCH or a DTCH.

In one area, a predetermined base station may simultaneously use various frequencies. In this case the network selects one of various frequencies to provide the MBMS service only in the frequency and provide the dedicated bearer to each UE in all frequencies, in order to efficiently use radio resources.

In this case, when the UE that receives the service by using the dedicated bearer in a frequency in which the MBMS service is not provided intends to receive the MBMS service, the UE needs to be handed over to a frequency in which the MBMS is provided. To this end, the UE transmits an MBMS interest indication to the base station. That is, when the UE intends to receive the MBMS service, the UE transmits the MBMS interest indication and when the base station receives the indication, the base station recognizes that the UE intends to receive the MBMS service, the base station moves to the frequency in which the MBMS is provided. Herein, the MBMS interest indication means information that the UE intends to receive the MBMS service and additionally includes information regarding which frequency the UE intending to move to.

UE that intends to receive a specific MBMS service first determines frequency information and broadcasting time information in which the specific service is provided. When the MBMS service has already been broadcasted or starts to be broadcasted, the UE sets a priority of a frequency in which the MBMS service is provided to a highest value. The UE perform a cell reselection procedure by using reset frequency priority information to receive the MBMS service by moving to a cell providing the MBMS service.

When the UE is receiving the MBMS service or is interested in receiving the MBMS service and when the UE may receive the MBMS service while camping on the frequency in which the MBMS service is provided, it may be considered that a highest priority is applied to the corresponding frequency during an MBMS session as long as statuses given below is continued while a reselected cell broadcasts SIB13.

When SIB15 of the serving cell indicates that one or more MBMS service area identities (MBMS SAIs) are included in a user service description (USD) of the corresponding service When the SIB15 is not broadcasted in the serving cell and the corresponding frequency is included in the USD of the corresponding service Hereinafter, in-device coexistence (IDC) will be described.

One UE may include a global navigation satellite system (GNSS) receiver in addition to a transceiver for the wireless communication system such as the LTE, the WiFi, Bluetooth (BT), or the like in order for the user to access various networks anywhere anytime. For example, the UE may UE with LTE and BT modules for receiving a VoIP service and a multimedia service by using BT equipment, UE with the LTE module and a WiFi module for traffic distribution, UE with a GNSS module and the LTE module for additionally acquiring positional information, and the like.

Since multiple transceivers are close to each other in one UE, the case occurs when power transmitted from one transmitter has higher strength than reception power of another receiver. IDC interference between two transceivers may be prevented by leaving a gap in filter technology or a use frequency. However, when multiple wireless communication modules operates in a neighbor frequency in one UE, the interference may not sufficiently be removed by the current filter technology. The problem needs to be solved for coexistence of transceivers for a plurality of wireless communication modules in the UE afterwards.

Figure 14:
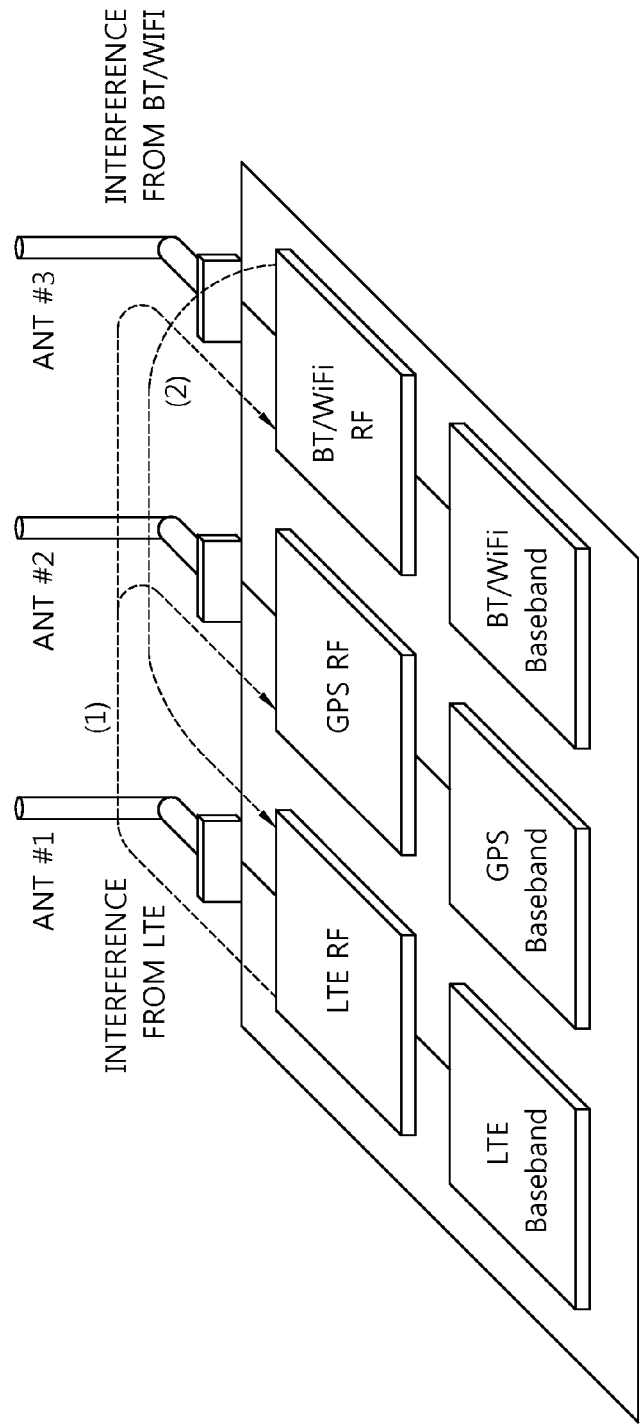
FIG. 14 illustrates a situation in which LTE, GPS, and BT/WiFi may interfere with each other under an IDC environment in which the LTE, the GPS, and the BT/WiFi coexist in one UE.

FIG. 14 illustrates a situation in which LTE, GPS, and BT/WiFi may interfere with each other under an IDC environment in which the LTE, the GPS, and the BT/WiFi coexist in one UE.

IDC interference avoidance is generally divided into three types according to whether there is a coordination with another communication module which coexists with the LTE module and whether there is a coordination with the LTE module and the base station for solving the IDC interference. A first mode is a mode in which there is no coordination for avoiding the IDC interference among communication modules which coexist and between the LTE and the network. In this case, since the LTE module does not know information on another communication module which coexists therewith, the LTE module may not normally process degradation of service quality due to the IDC interference. A second mode is a mode in which there is a coordination among the communication modules which coexist in the UE. In this mode, the modules which coexist may know an on/off state, a traffic transmission state, and the like of a counterpart module. However, in this mode, there is no coordination between the UE and the network. A last mode is a mode in which there is a coordination even between the UE and the network as well as the coordination among the coexistence modules in the UE. In this mode, the coexistence modules may know the on/off state, the traffic transmission state, and the like of the counterpart module, and the UE notifies an IDC interference state to the network to allow the network to make a decision and take an action for avoiding the IDC interference.

The LTE module may measure the IDC interference through the inter/intra-frequency measurement as well as the coordination with another module in the UE.

The interference may be the IDC interference which occurs when different communication modules coexist and operate in one UE and the IDC interference occurs in the following coexistence statuses.

The interference occurs under a status in which the LTE and the WiFi coexist.

The interference occurs under a status in which the LTE and the BT coexist.

The interference occurs under a status in which the LTE and the GNSS coexist.

The communication modules operate in the neighboring frequency in terms of the frequency as described below to reduce mutual interference.

LTE TDD may operate in band 40 (2300 MHz to 2400 MHz) and the WiFi and the BT may operate in an unlicensed band (2400 MHz to 2483.5 MHz). In this case, transmission of the LTE may interfere in the WiFi and the BT and transmission of the WiFi or BT may interfere in reception of the LTE.

LTE FDD may perform uplink transmission in band 7 (2500 MHz to 2700 MHz) and the WiFi and the Bluetooth may operate in the unlicensed band (2400 MHz to 2483.5 MHz). In this case, the uplink transmission of the LTE may interfere in the reception of the WiFi or Bluetooth.

The LTE FDD may perform the uplink transmission in band 13 (UL: 777-787 MHz, DL: 746-756 MHz) or band 14 (UL: 788-798 MHz, DL: 758-768 MHz) and receive a GPS radio in 1575.42 MHz. In this case, the uplink transmission of the LTE may interfere in the reception of the GPS.

At current 3GPP, two directions are generally considered in order to solve the IDC interference. A first direction is a method (frequency division multiplexing (FDM)) in which a communication module that makes interference or a communication module that receives interference changes the frequency. A second direction is a method (time division multiplexing (TDM)) in which communication modules that share one frequency divide and use a time.

When the UE may transmit the IDC indication to the network when internal interference between an LTE device in the UE and another ISM band device in the UE, that is, the IDC interference is sensed. The IDC indication may indicate that the UE experiences the IDC interference. The IDC indication may include information on a specific frequency and/or a time interval pattern. Herein, FDM is performed in order to solve the IDC interference problem based on the specific frequency information and TDM may be performed based on the information on the specific time interval pattern. The specific frequency information may indicate the frequency in which the IDC interference occurs and the specific time interval pattern information may indicate a time interval in which the IDC interference occurs due to an operation of another ISM band device.

The network may be configured to allow the UE to transmit the UE-originated indication such as the proximity indication, the MBMS interest indication, and the IDC indication to the network. However, after the network is configured to transmit the UE-originated indication, the network may not directly control UE related information of the UE-originated indication. Therefore, when the network is operated based on the UE related information provided by the UE-originated indication, the quality of the service provided to the UE may be further degraded. This may occur under an exemplary environment given below.

1) MBMS Interest Indication

An environment is assumed, in which the MBMS service is being provided on two frequencies and a confusion occurs on one frequency. Therefore, when the UE that is interested in the MBMS service moves to a cell in a confused frequency to receive the service, the UE may not normally receive the MBMS. However, in operating the network depending on the existing UE-originated indication, once the UE is configured to transmit the MBMS interest indication, when the MBMS is provided or is anticipated to be provided in even any one of both frequencies, the UE makes information related with the corresponding frequency be included in the MBMS interest indication and reports the information to the network. In this case, since the network moves the UE to the cell which is operated in the corresponding frequency regardless of the occurrence of the confusion, a problem that the UE moves to the cell on the confused frequency may occur.

2) Cell Sensing Indication

A specific-type cell may be deployed. The specific-type cell may be the CSG cell. The UE accesses the CSG cell to receive a better service. Further, the specific-type cell may be small cells such as the pico cell and the femto cell which are small cells as not the CSG cell but public cells. It is assumed that the pico cell and the femto cell are deployed in the macro cell coverage and the public cells are being operated on a plurality of frequencies and the pico cell and the femto cell are cells for traffic offloading. When traffics in the macro cell are confused, the UE accesses the pico cell and the femto cell to attempt the traffic offloading.

When the UE discovers the specific-type cell such as the CSG cell, the pico cell, or the femto cell through the autonomous search procedure, the UE notifies the discovered specific-type cell to the network and the network may perform a procedure for moving the corresponding UE based on the discovered specific-type cell. The UE may transmit the cell sensing indication in order to discover the specific-type cell and notify the discovered specific-type cell to the network. The cell sensing indication transmitted when the CSG cell is sensed may be the proximity indication. The cell sensing indication transmitted when the small cell such as the pico cell or the femto cell is sensed may be a measurement report message triggered when the cell is sensed. The measurement report message transmitted as described above may not include an actual measurement result for the corresponding cell and may include a measurement result set as a predetermined value or a specific value. The reason is that the cell sensing indication is not the measurement report message is triggered by satisfaction of a report condition through the measurement. The network may verify that the corresponding measurement report message is the measurement report message transmitted depending on sensing the small cell through the measurement result set as the predetermined value or specific value.

The UE may transmit the specific-type cell through the autonomous search procedure so as to transmit the cell sensing indication to the network. However, when the network moves the UE to the specific-type cell for a communication environment or a specific purpose or even when the network moves the UE to the specific-type cell which is operated on a specific frequency or prevents the UE to move to the specific-type cell, the UE performs the autonomous search procedure regardless thereof and the network performs an inefficient operation of transmitting the cell sensing indication to the network according to a result of the performed autonomous search procedure. The unrequired autonomous search procedure and transmission of the cell sensing indication related therewith need to be improved.

A method is proposed, in which the network controls signaling of the UE-originated indication, in order for the UE to receive the better service by moving to a specific frequency and/or cell or for the UE to operate more efficiently by supplementing the inefficiency. The present invention proposes a method in which the network transmits the control information to the UE in order to control the UE related information transmitted to the network through the UE-originated indication.

Figure 15:
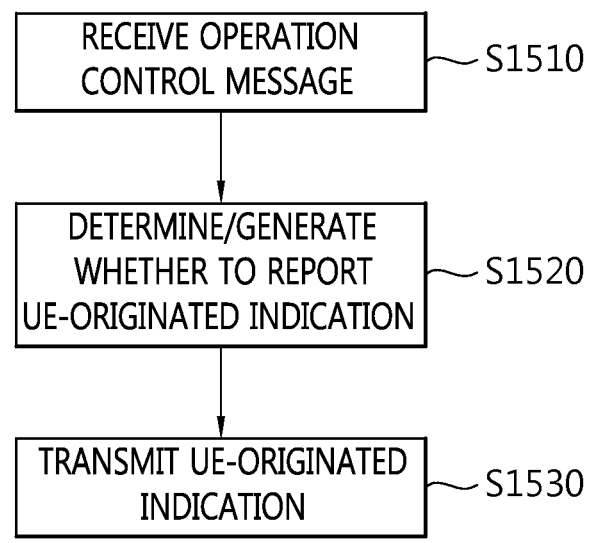
FIG. 15 is a diagram illustrating a method of controlling signaling according to an exemplary embodiment of the present invention.

FIG. 15 is a diagram illustrating a method of controlling signaling according to an exemplary embodiment of the present invention.

Referring to FIG. 15, the UE receives an operation control message from the network (S1510). The operation control message may include control information related with generation and reporting of the UE-originated indication of the UE. The control information may be implemented to control whether it is permitted that the UE generates the UE-originated indication for the specific frequency and/or specific cell and reports the generated UE-originated indication to the network. By this configuration, the network may limit the generation/reporting of the UE-originated indication by the UE to the specific frequency and/or specific cell domain.

The control information may include a white list of frequencies, which indicates that generating the UE-originated indication and reporting the generated UE-originated indication to the network are permitted for the specific frequency. The UE may be permitted to generate the UE-originated indication and report the generated UE-originated indication to the network for the frequency indicated by the white list of frequencies.

The control information may include a black list of frequencies, which indicates that generating and reporting the UE-originated indication for the specific frequency. The UE may not be permitted to generate and report the UE-originated indication for the frequency indicated by the black list of frequencies.

The control information may include a white list of cells, which indicates that generating the UE-originated indication and reporting the generated UE-originated indication to the network are permitted for the specific cell. The UE may be permitted to generate the UE-originated indication and report the generated UE-originated indication to the network for the cell indicated by the white list of cells.

The control information may include a black list of cells, which indicates that generating the UE-originated indication and reporting the generated UE-originated indication to the network are not permitted for the specific cell. The UE may not be permitted to generate and report the UE-originated indication for the frequency indicated by the black list of cells.

The control information may indicate a tracking section in which the UE is permitted to generate the UE-originated indication and report the generated UE-originated indication to the network. In this case, the control information may include a list of tracking section codes.

The control information may indicate a PLMN in which the UE is permitted to generate the UE-originated indication and report the generated UE-originated indication to the network. In this case, the control information may include a list of one or more PLMNs. When the UE receives PLMN related control information, the UE may be implemented to verify a PLMN of a corresponding cell by verifying the SIB1 of the target cell.

The control information may indicate at least one service section in which the UE is permitted to generate the UE-originated indication and report the generated UE-originated indication to the network. In this case, the control information may include an ID list of the service section. For example, the service section may be expressed as MBSFN section ID information in association with the MBMS interest indication of the UE.

Meanwhile, the control information may be implemented by a combination of one or more control information types. For example, the control information may be implemented by a combination of the white list of frequencies and the white list of cells.

The UE may determine whether to report the UE-originated indication to the network based on the operation control message and generate the UE-originated indication (S1520).

The UE-originated indication may be a cell sensing indication message. The cell sensing indication message may be the proximity indication that indicates that the UE senses the CSG cell and accesses the corresponding cell or indicates that the UE deviates from the CSG cell. The cell sensing indication message may indicate that the UE senses the small cells deployed for offloading, such as the pico cell and the femto cell. In this case, the cell sensing indication message as a measurement report message triggered when the specific cell is sensed may include a measurement result.

However, since the cell sensing indication message is not a message that is transmitted by satisfaction of the report condition by the measurement result, the measurement result may be set to a predetermined value or a specific value.

When the UE receives the operation control message including the white list of frequencies, the UE may generate the cell sensing indication only for the cell on the frequency included in the white list of frequencies. When the UE receives the operation control message including the black list of frequencies, the UE may not generate the cell sensing indication only for the cell on the frequency included in the black list of frequencies. When the UE receives the operation control message including the white list of cells and the black list of cells, the UE may generate the cell sensing indication for the cell included in the white list of cells or generate the cell sensing indication only for the cell not included in the black list of cells.

The UE-originated indication may be the MBMS interest indication. The MBMS interest indication may indicate that the UE is interested in the MBMS or receives the MBMS. The MBMS interest indication may indicate that the UE is not interested in the MBMS any longer or does not receive the MBMS.

When the UE receives the operation control message including the white list of frequencies, the UE may generate the MBMS interest indication that indicates that the UE is interested in receiving the MBMS service provided on the frequency included in the white list of frequencies or receives the MBMS service provided on the corresponding frequency. Although the MBMS is provided on the frequency not included in the white list, the UE may not generate the MBMS interest indication. When the MBMS interest indication is generated as described above, the UE may make a frequency indication indicating the corresponding indication be included in the MBMS interest indication.

When the UE receives the operation control message including the black list of frequencies, the UE may not generate the cell sensing indication only for the cell on the frequency included in the black list of frequencies.

When the UE receives an operation control message including a specific service section list, the UE may generate the MBMS interest indication only for the frequency depending on an MBMS SAI included in the specific service section list of the UE operation control message in the MBMS SAI included in the system information of the serving cell.

The UE-originated indication may be the IDC indication. The IDC indication may indicate that the internal interference occurs between the LTE device and the ISM band device in the UE and the IDC indication may include a frequency indication that indicates a frequency related with the internal interference.

When the UE receives the operation control message including the white list of frequencies, the UE may generate the IDC indication only when the internal interference occurs on the frequency included in the white list of frequencies. When the internal interference occurs on the frequency other than the frequency included in the white list, the UE may not generate the IDC indication.

When the UE receives the operation control message including the black list of frequencies, the UE may generate the IDC indication only when the internal interference occurs on the frequency other than in the black list of frequencies. Although the internal interference occurs on the frequency included in the black list, the UE may not generate the IDC indication.

The UE may transmit the generated UE-originated indication to the network (S1530).

When the network receives the UE-originated indication from the UE, the network may control an operation of the UE based on the UE-originated indication. When the network receives the proximity indication, the UE may hand over the UE to the target CSG cell according to the proximity indication. When the network receives the MBMS interest indication, the network may move the UE in the corresponding frequency in which the MBMS is provided. When the network receives the IDC indication, the network may control an operation through the LTE device of the UE on the corresponding frequency.

Information related with effectiveness of the control information provided to the UE may be provided through the operation control message. The effectiveness related information is included in the operation control message to be provided to the UE. The effectiveness related information may be information previously set in the UE. The UE may determine whether to generate the UE-originated indication and transmit the generated UE-originated indication to the network based on the control information according to the effectiveness related information.

The effectiveness related information may be implemented by an effectiveness timer. The effectiveness timer may be a value set by the network or a value previously set in the UE. When the effectiveness timer is applied, the control information is effective during a time interval depending on the effectiveness timer. When the UE acquires the operation control message, the UE may start the effectiveness timer. When the effectiveness timer is terminated, the UE may discard the control information of the operation control message. When the UE deviates from the RRC_CONNECTED state, the UE may reset the effectiveness timer or continuously drive the time until the timer is terminated.

Figure 16:
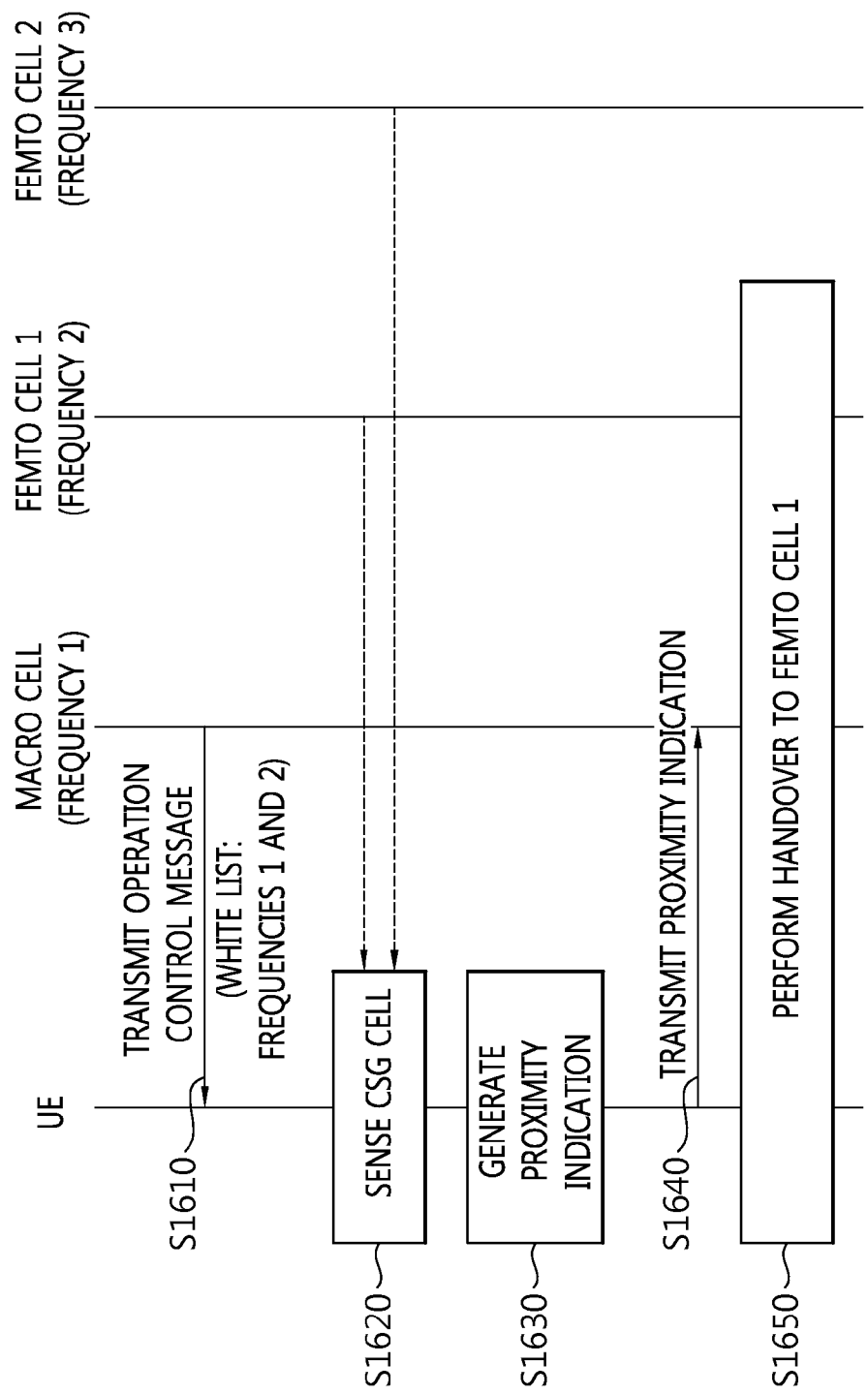
FIG. 16 is a diagram illustrating an example of the method of controlling signaling according to the exemplary embodiment of the present invention.

FIG. 16 is a diagram illustrating an example of the method of controlling signaling according to the exemplary embodiment of the present invention.

In the example, it is assumed that the macro cell, femto cell 1, and femto cell 2 are operated in frequencies 1, 2, and 3, respectively. Further, the femto cells 1 and 2 are the CSG cells and it is assumed that the UE is a member of the femto cells 1 and 2.

Referring to FIG. 16, the UE receives the operation control message from the macro cell (S1610). The operation control message may include the control information implemented by the white list of cells and/or the white list of frequencies. In the example, the control information may include the white list of frequencies and the white list of frequencies may indicate the frequencies 1 and 2.

The UE senses the CSG cell (S1620). The UE may sense the CSG cell through the autonomous search procedure and determine whether the CSG cell is a member CSG cell of the UE.

The UE determines whether to report the UE-originated indication and thus generate the UE-originated indication, based on the white list of frequencies included in the operation control message (S1630). In the example, since the UE-originated indication is related with the CSG cell, the UE-originated indication may be the proximity indication. It can be seen that the UE is permitted to transmit the proximity indication for the femto cell 1 which is operated on the frequency 2 based on the frequencies 1 and 2 indicated by the white list, but is not permitted to transmit the proximity indication for the femto cell 2 which is operated on the frequency 3. Accordingly, the UE may generate the proximity indication including information related with the RAT of the femto cell 1 and information related with the frequency.

The UE transmits the proximity indication to the macro cell (S1640).

The network that receives the proximity indication from the UE allows the UE to be handed over to the femto cell 1 which is the CSG cell (S1650).

Figure 17:
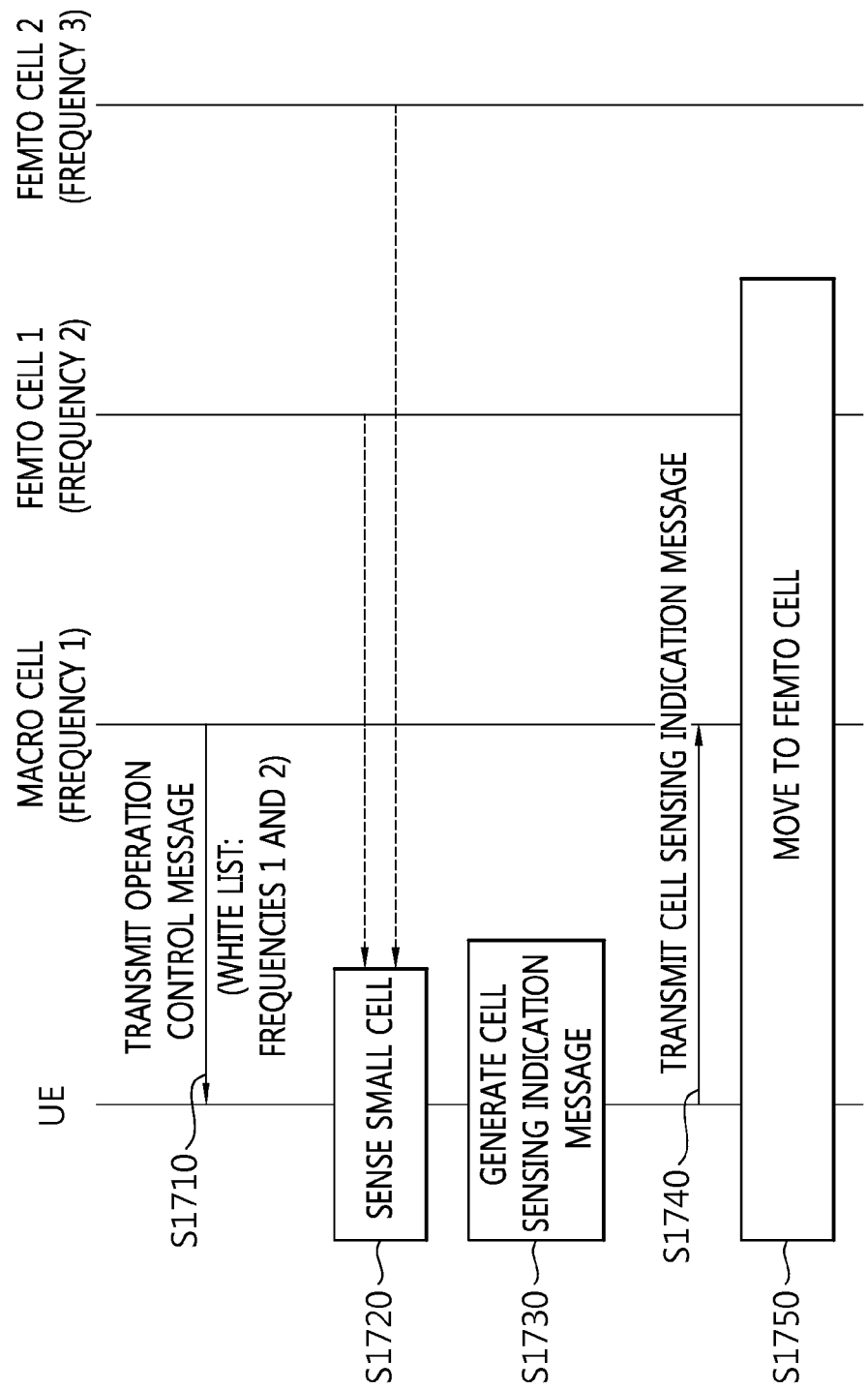
FIG. 17 is a diagram illustrating an example of the method of controlling signaling according to the exemplary embodiment of the present invention.

FIG. 17 is a diagram illustrating an example of the method of controlling signaling according to the exemplary embodiment of the present invention.

In the example, it is assumed that the macro cell, the femto cell, and the pico cell are operated in the frequencies 1, 2, and 3, respectively. Further, it is assumed that the femto cell and the pico cell are the non-CSG cells.

Referring to FIG. 17, the UE receives the operation control message from the macro cell (S1710). The operation control message may include the control information implemented by the white list of cells and/or the white list of frequencies. In the example, the control information may include the white list of frequencies and the white list of frequencies may indicate the frequencies 1 and 2.

The UE senses the small cell (S1720). The UE may sense the cell through the autonomous search procedure or a cell search procedure and recognize that the corresponding cell is the small cell such as the femto cell or the pico cell based on identification information (e.g., PCI and GCI) identified in the cell. If the white list of cells is given, the cell included in the cell list is recognized as the small cell.

The UE determines whether to report the UE-originated indication and thus generate the UE-originated indication, based on the white list of frequencies included in the operation control message (S1730). In the example, the UE-originated indication may be a message that indicates cell sensing, so-called, the cell sensing indication message. The cell sensing indication message may be implemented through the proximity indication message or the measurement report message. It can be seen that the UE is permitted to transmit the cell sensing indication message for the femto cell which is operated on the frequency 2 based on the frequencies 1 and 2 indicated by the white list, but is not permitted to transmit the cell sensing indication message for the pico cell which is operated on the frequency 3. Accordingly, the UE may generate the cell sensing indication message including information related with the RAT of the femto cell and information related with the frequency. Further, the cell sensing indication message may further include the measurement result. Meanwhile, since the measurement report message is not the message that is transmitted by satisfaction of the report condition according to the measurement result, the measurement report message includes the measurement result, however, the measurement result may be set to a predetermined value or a specific value. The network may verify that the corresponding measurement report message is a cell sensing indication message of the measurement report message type transmitted depending on sensing the small cell through the measurement result set as the frequency reported by the UE, the RAT information, and the measurement result set to the predetermined value or specific value.

The UE transmits the cell sensing indication message to the macro cell (S1740).

The network that receives the cell sensing indication message allows the UE to move to the femto cell (S1750).

The network configures the operation control message including the control information and provides the configured operation control message to the UE to control signaling related with movement of the UE to the CSG cell and the small cell and allow the UE to access a specific cell or a specific frequency or prevent the UE from accessing the specific cell or specific frequency.

Figure 18:
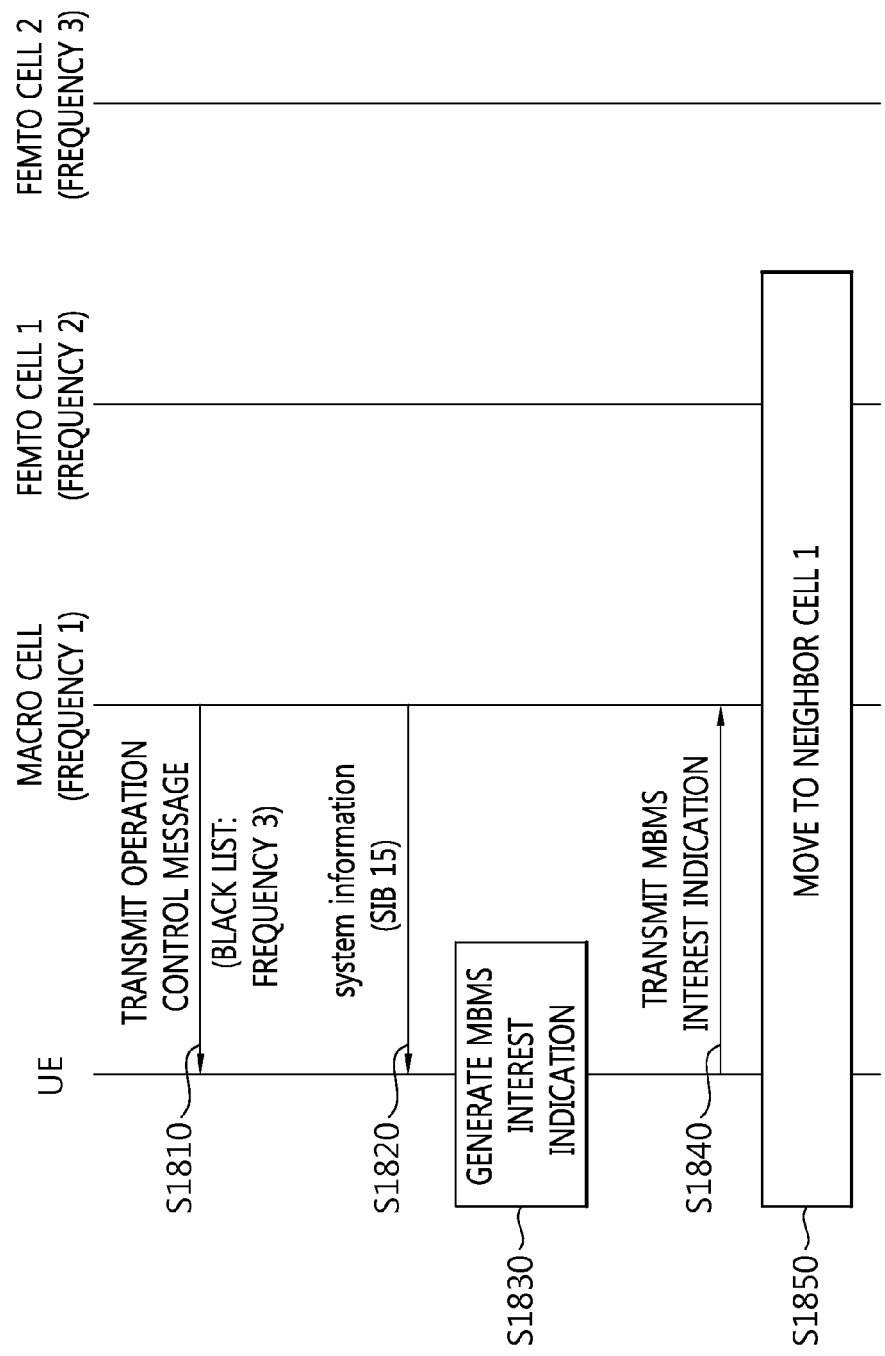
FIG. 18 is a diagram illustrating another example of the method of controlling signaling according to the exemplary embodiment of the present invention.

FIG. 18 is a diagram illustrating another example of the method of controlling signaling according to the exemplary embodiment of the present invention In the example, it is assumed that the serving cell, the neighbor cell 1, and the neighbor cell 2 are operated in the frequencies 1, 2, and 3, respectively. Further, it is assumed that the neighbor cells 1 and 2 provide the MBMS in the frequencies 2 and 3, respectively.

Referring to FIG. 18, the UE receives the operation control message from the serving cell (S1810). The operation control message may include the control information implemented by the black list of cells and/or the black list of frequencies. In the example, the control information may include the black list of frequencies and the black list of frequencies may indicate the frequency 3.

The UE receives the system information from the serving cell (S1820). The system information may include SIB 15 including MBMS SAI related information. The UE may determine whether to enter an interested the MBMS service section based on the SIB 15 of the system information. The SIB 15 as the MBMS SAI related information may include the inter-frequency providing the MBMS service and the corresponding MBMS SAI. The SIB 15 as the MBMS SAI related information may include an MBMS SAI list for a serving frequency. In the example, it is assumed that the SIB 15 is implemented to indicate that the MBMS is provided in the frequencies 2 and 3.

The UE determines whether to report the UE-originated indication and thus generate the UE-originated indication, based on the system information and the black list of frequencies included in the operation control message (S1830). In the example, since the UE-originated indication is related with the MBMS, the UE-originated indication may be the MBMS interest indication. The UE may know that the MBMS is provided in the frequencies 2 and 3 through the SIB 15, but know that transmitting the MBMS interest indication for the frequency 3 is not permitted through the black list of frequencies. Therefore, the UE may generate the MBMS interest indication including the MBMS frequency indication that indicates the frequency 2.

The UE transmits the MBMS interest indication to the serving cell (S1840).

The network that receives the MBMS interest indication from the UE may determine that the UE is interested in the MBMS provided in the frequency 2 and move the UE to the neighbor cell 1 that is providing the MBMS on the frequency 2 (S1850).

The network configures the operation control message including the control information and provides the configured operation control message to the UE as described above to control MBMS related signaling of the UE and allow the UE to access an appropriate frequency and/or cell.

According to the exemplary embodiment of the present invention with reference to FIGS. 15 to 18, the network may control signaling related with the UE-originated indication of the UE. Therefore, the network may be configured to control an operation of the UE to be suitable for a current communication environment or receive a better service by moving to a specific frequency and/or cell.

Figure 19:
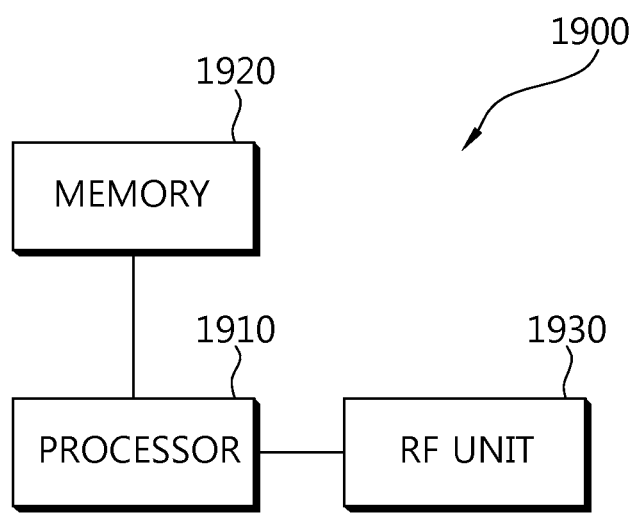
FIG. 19 is a block diagram illustrating a wireless device in which the exemplary embodiment of the present invention is implemented.

FIG. 19 is a block diagram illustrating a wireless device in which the exemplary embodiment of the present invention is implemented. This device may be configured to implement the method of controlling signaling according to the exemplary embodiment of the present invention, which is described with reference to FIGS. 15 to 18.

The wireless device 1900 includes a processor 1910, a memory 1920, and an RF unit 1930. The processor 1910 implements a function, a process, and/or a method which are proposed. The processor 1910 may be configured to transmit the operation control message including the control information which is a basis to control the UE-originated indication signaling. The processor 1910 may be configured to determine whether to report the UE-originated indication to the network based on the control information of the operation control message and thus generate and transmit the UE-originated indication. The processor 1910 may be configured to allow the UE to perform a movement related operation according to the UE-originated indication. The processor 1910 may be configured to perform the exemplary embodiment described with reference to FIGS. 15 to 18.

The RF unit 1930 is connected with the processor 1910 to transmit and/or receive a radio signal.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for controlling a signal performed by a user equipment (UE) in a wireless communication system, the method comprising:
   receiving, from a serving cell, control information including a frequency list;
   sensing a closed subscriber group (CSG) cell using a frequency within the frequency list, wherein the CSG cell is a cell which the UE is permitted to access; and
   reporting, to the serving cell, a cell sensing indication including a proximity indication when the CSG cell is sensed, wherein the proximity indication indicates that the UE enters an area of the CSG cell,
   wherein the frequency list includes a plurality of frequencies in which reporting the cell sensing indication is permitted.

2. The method of claim 1, wherein the control information includes cell list, and the cell list includes a plurality of cells in which reporting the cell sensing indication is permitted.

3. The method of claim 2,
   wherein the sensing the CSG cell using the frequency within the frequency list further includes sensing the CSG cell using a cell within the cell list.

4. The method of claim 1,
wherein the proximity indication includes information indicating a radio access technology (RAT) of the CSG cell and information indicating the frequency of the CSG cell.

5. The method of claim 1, further comprising:
performing a handover to the CSG cell.

6. The method of claim 1,
wherein the CSG cell is a small cell installed for offloading, and
wherein the cell sensing indication includes a measurement report message which is triggered when the small cell is sensed.

7. The method of claim 6,
wherein the control information includes a cell list, and
wherein the sensing the CSG cell using the frequency within the frequency list includes sensing the small cell using a cell within the cell list.

8. The method of claim 6,
wherein reporting the cell sensing indication including the proximity indication includes reporting the cell sensing indication including the proximity indication when the small cell is sensed.

9. The method of claim 1, further comprising:
receiving, from the serving cell, system information,
wherein the system information includes system information block type 15 (SIB 15) including information on at least one multimedia broadcast and multicast service (MBMS) frequency, and
wherein the cell sensing indication includes an MBMS interest indication indicating that the UE is interested in an MBMS.

10. The method of claim 9, further comprising:
reporting the MBMS interest indication when at least one MBMS frequency of the SIB 15 includes the frequency included in the frequency list.

11. The method of claim 10, wherein the MBMS interest indication includes information indicating the frequency.

12. The method of claim 11, further comprising:
moving to a neighbor cell which is operated in the frequency.

13. A user equipment (UE) in a wireless communication system, the UE comprising:
a radio frequency (RF) unit which is configured to transmit or receive a radio signal; and
a processor which is configured to operate in functional association with the RF unit,
wherein the processor is further configured to:
receive, from a serving cell via the RF unit, control information including a frequency list,
sense a closed subscriber group (CSG) cell using a frequency within the frequency list, wherein the CSG cell is a cell which the UE is permitted to access, and
report, to the serving cell via the RF unit, a cell sensing indication including a proximity indication when the CSG cell is sensed, wherein the proximity indication indicates that the UE enters an area of the CSG cell, and
wherein the frequency list includes a plurality of frequencies in which reporting the cell sensing indication is permitted.

* * * * *